United States Patent
Minefuji

(10) Patent No.: US 10,156,708 B2
(45) Date of Patent: Dec. 18, 2018

(54) PROJECTION ZOOM LENS AND PROJECTION TYPE IMAGE DISPLAY DEVICE

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/727,375

(22) Filed: Oct. 6, 2017

(65) Prior Publication Data

US 2018/0113286 A1    Apr. 26, 2018

(30) Foreign Application Priority Data

Oct. 20, 2016 (JP) .................. 2016-205738

(51) Int. Cl.
| | |
|---|---|
| *G02B 15/167* | (2006.01) |
| *G02B 7/10* | (2006.01) |
| *G02B 13/00* | (2006.01) |
| *G02B 15/177* | (2006.01) |

(52) U.S. Cl.
CPC .......... *G02B 15/167* (2013.01); *G02B 7/10* (2013.01); *G02B 13/009* (2013.01); *G02B 13/0045* (2013.01); *G02B 15/177* (2013.01)

(58) Field of Classification Search
CPC .................................................. G02B 15/167
USPC ........................................................ 359/689
See application file for complete search history.

(56) References Cited

U.S. PATENT DOCUMENTS 8,270,091 B2 * 9/2012 Yamamoto ........... G02B 15/177
                                                              359/680
2010/0020293 A1    1/2010 Yamamoto

FOREIGN PATENT DOCUMENTS

| JP | H06-94996 A | 4/1994 |
|---|---|---|
| JP | H10-39214 A | 2/1998 |
| JP | H11-072703 A | 3/1999 |
| JP | H11-194274 A | 7/1999 |
| JP | 2003-215453 A | 7/2003 |
| JP | 3996981 B2 | 10/2007 |
| JP | 2010-32567 A | 2/2010 |
| JP | 2010-44263 A | 2/2010 |
| JP | 5152854 B2 | 2/2013 |
| JP | 5152855 B2 | 2/2013 |

* cited by examiner

*Primary Examiner* — James Jones
(74) *Attorney, Agent, or Firm* — Oliff PLC

(57) ABSTRACT

First through third lens groups constituting a projection zoom lens can be configured as a zoom lens of the type in which the first and second lens groups, for example, are moved when zooming, and the first lens group, for example, is moved when focusing. Further, by fulfilling the conditional formula (1), it is possible to achieve that the back focus is prevented from becoming too short, and the back focus is prevented from becoming too long while ensuring the sufficient space on the reduction side, and the lens diameter on the reduction side is prevented from becoming too large in the case of adopting a roughly telecentric configuration on the reduction side.

20 Claims, 19 Drawing Sheets

PROJECTION ZOOM LENS AND PROJECTION TYPE IMAGE DISPLAY DEVICE

BACKGROUND

1. Technical Field

The present invention relates to a projection zoom lens suitable for incorporation in a projector for projecting an image of an image display element in an enlarged manner, and a projection type image display device incorporating the projection zoom lens.

2. Related Art

In recent years, it is widely performed to conduct a presentation using a projection type display device using an image display element or a light valve such as a liquid crystal display element or a reflective display element. For an optical system of a projector for projecting the image of the image display element in an enlarged manner there are required a long back focus for disposing a prism for combining light beams from three image display elements of red, green, and blue with each other, a preferable telecentric optical system characteristic for preventing the color variation from occurring, and small f-number (i.e., a bright optical system) for efficiently acquiring the light from a illumination system. Further, in recent years, there has increased the frequency of the case in which it is required to have a wide field angle at the same time in addition to the zoom function so as to easily be installed even in a narrow place.

As a measure for obtaining a projection zoom lens having the long back focus while having the wide field angle as described above, there is often adopted a retrofocus type lens configuration, and it is common to dispose a lens group having high negative power as the lens group on the most enlargement side. Further, in the projection zoom lens, in order to ensure high resolving power and a flat image surface in a broad projection range, it is often performed to fix the lens group on the most enlargement side and the lens group on the most reduction side, and then move lens groups disposed therebetween to thereby perform zooming when changing the magnifying power, and thus achieve the change in the magnifying power by moving the plurality of lens groups. Further, when performing focusing, focusing is achieved by moving the lens group on the most enlargement side in many cases.

As described above, in the related-art projection zoom lens, since zooming is performed by moving the plurality of lens groups, it is necessary to move the lens groups in cooperation with each other, and there is adopted a frame structure using an interlocking cam or the like. Therefore, there is a problem that the mechanism becomes complicated, and the cost increases accordingly.

However, in zooming and focusing in the projector, it is sufficient to perform zooming in accordance with the screen size to determine the projection size, and then perform the focus adjustment. In other words, even if some defocus occurs during zooming, it is sufficient to perform refocusing, and there is a small necessity for a common zoom lens with which no defocus occurs during zooming. The zoom lens having the structure of readjusting the defocus during zooming as described above is called a varifocal lens, and is used as a zoom lens only for adjusting the zoom position and the focus position once in the installation as an initial setting as is common in lenses for monitoring cameras. The varifocal lens of this kind is a zoom lens of the type of performing zooming and focusing by moving two lens groups, and commonly adopts a configuration of changing the zoom magnification with one of the lens groups, and performing refocusing with respect to the focal position thus defocused with the other of the lens groups.

Incidentally, in an optical system for a projector, since the telecentric characteristic on the image display element side becomes necessary as described above, in the case of adopting the varifocal lens, it is difficult for a two-group configuration, and it is conceivable to dispose a stationary group in front of the image display element. As the projection zoom lens using the stationary group on the enlargement side using the three-group configuration as described above, there can be cited one disclosed in JP-A-2003-215453 (Document 1). However, the projection zoom lens disclosed in Document 1 has the f-number as dark as class 2.5, and is large in the number of lenses constituting the projection zoom lens, and is therefore not enough in the brightness and the reduction in cost. Further, there also exists such a configuration in which the number of lenses constituting the projection zoom lens is suppressed to 7 or 8 to thereby achieve the reduction in cost as disclosed in JP-A-2010-32567 (Document 2). However, the projection zoom lens disclosed in Document 2 has the f-number as slightly dark as class 2, and has the half viewing angle of up to about 27°, and the projection distance cannot help elongating. Therefore, there is room for improvement in wider field angle.

SUMMARY

An advantage of some aspects of the invention is to provide a projection zoom lens having the brightness corresponding to the f-number of about 1.6, capable of covering the half viewing angle up to about 30°, compact in size, and achieving the reduction in cost.

A projection zoom lens according to an aspect of the invention is a zoom lens including a first lens group having negative refracting power, a second lens group having positive refracting power, and a third lens group having positive refracting power, wherein three lens groups of the first lens group, the second lens group, and the third lens group are arranged in this order from a enlargement side, a distance between the first lens group and the second lens group, and a distance between the second lens group and the third lens group vary to achieve a magnification change and focusing when zooming and focusing, the second lens group includes a positive lens disposed on a most enlargement side and having a convex surface facing to the enlargement side, and one of a convex surface, which is lower in power than the convex surface facing to the enlargement side, and a concave surface on a reduction side, and a positive lens disposed on a most reduction side and having a convex surface facing to the reduction side, and one of a concave surface and a convex surface, which is lower in power than the convex surface facing to the reduction side, on the enlargement side, and the third lens group is formed of a single positive lens having a convex surface facing to the enlargement side, and the following conditional formula (1) is fulfilled.

$$1.4 < Bf/fw < 2.0 \tag{1}$$

where
  $fw$: focal length of an overall lens system at a wide-angle end

Bf: focal length (air-equivalent length) of the back focus with the prism and other flat plates excluded The projection zoom lens has the three-group configuration, and can be configured as a zoom lens of the type in which, for example, the first and second lens groups (the second lens group alone, the second and third lens groups, or all of the first through three lens groups) are moved when zooming, and the first lens group, for example, is moved when focusing. In the projection zoom lens described above, the conditional formula (1) relates to the back focus. Specifically, the conditional formula (1) is for ensuring the space for arranging the cross prism, the polarization plate, and other optical members on the reduction side, and smoothly performing cooling by keeping appropriate distances there between. By exceeding the lower limit of the conditional formula (1), it is possible to prevent the back focus from becoming too short, and ensure the sufficient space for disposing the optical members on the reduction side, and cooling and so on become easy. Further, by setting a lower value than the upper limit of the conditional formula (1), it is possible to prevent the back focus from becoming too long while ensuring the space, and it is possible to prevent the lens diameter on the reduction side from becoming too large in the case of adopting a roughly telecentric configuration on the reduction side.

According to another aspect of the invention, the first lens group moves from the enlargement side toward the reduction side in the magnification change from the wide-angle end to a predetermined intermediate focal length position, and moves from the reduction side toward the enlargement side in the magnification change from the predetermined intermediate focal length position to the telescopic end. In other words, the first lens group draws a movement locus so as to turn around in the middle. In this case, the displacement of the focal position can be reduced despite the zooming is achieved by two groups alone, and zooming and focusing become easy.

According to still another aspect of the invention, the first lens group moves from the enlargement side toward the reduction side in the magnification change from the wide-angle end to the telescopic end. In this case, it results that the second lens group moves from the reduction side toward the enlargement side in the magnification change from the wide-angle end to the telescopic end. By adopting such a configuration, miniaturization becomes possible compared to a common four-or-more-group zoom lens adopting the configuration in which the lens group on the enlargement side is used for focusing, the group on the reduction side is set to the stationary group, and the intermediate lens group is moved.

According to still another aspect of the invention, in the magnification change from the wide-angle end to the telescopic end, the first lens group is semi-fixed, the second lens group moves from the reduction side toward the enlargement side, and the third lens group moves from the enlargement side toward the reduction side. Also in this case, the miniaturization becomes possible compared to a common four-or-more-group zoom lens described above.

According to still another aspect of the invention, a varifocal type is adopted, and in the magnification change from the wide-angle end to the telescopic end, the second lens group moves from the reduction side toward the enlargement side, and either of the first lens group and the third lens group is moved to thereby make it possible to correct a focus shift due to the magnification change while achieving both of the focus shift due to the zoom and the focusing motion when changing the projection distance.

According to still another aspect of the invention, the first lens group is constituted by three lenses consisting of two negative lenses and a positive lens arranged in this order from the enlargement side, and defining a focal length of the first lens group as f1, the following conditional formula (2) is fulfilled.

$$1.5<|f1/fw|<3.0 \qquad (2)$$

The conditional formula (2) is related to the power of the first lens group, and is for making it possible to provide the sufficient back focus to suppress the generation of the variety of aberrations to a low level. By exceeding the lower limit of the conditional formula (2), it is possible to prevent the negative power of the first lens group from becoming too high, namely the power of the two negative lenses from becoming excessively high, and the correction of the chromatic aberration of magnification in the first lens group is easy. Further, by adopting a value lower than the upper limit of the conditional formula (2), it is possible to prevent the negative power of the first lens group from becoming too low, and therefore, it is possible to prevent the power of the positive lens from becoming too high, and thus, it becomes easy to correct the coma aberration and the distortion aberration in a balanced manner.

According to still another aspect of the invention, the second lens group is constituted by five lenses, namely a positive lens having a convex surface facing to the enlargement side, a negative lens having a concave surface facing to the enlargement side, a negative lens having a concave surface facing to the enlargement side and a positive lens having a convex surface facing to the reduction side, and a positive lens having a convex surface facing to the enlargement side arranged in this order from the enlargement side, and defining a focal length of the second lens group as f2, the following conditional formula (3) is fulfilled.

$$1.5<f2/fw<3.5 \qquad (3)$$

The conditional formula (3) is the condition related to the power of the second lens group. By exceeding the lower limit of the conditional formula (3), the positive power of the second lens group is prevented from becoming too high, and thus it is possible to prevent the spherical aberration and the off-axis coma aberration from becoming worse, and thus, it is possible to prevent the coma flare from increasing, and the contrast from decreasing in the entire area of the screen. Therefore, it becomes easy to obtain the bright f-number, and it becomes also easy to ensure the sufficientrelative illumination. Further, by adopting a value lower than the upper limit of the conditional formula (3), the positive power of the second lens group is prevented from becoming too low, and thus, it is possible to prevent the displacement of the second lens group from becoming large when changing the magnification, which is preferable from the viewpoint of miniaturization. Further, since it is possible to prevent the displacement of the position of the aperture stop in the second lens group from increasing, it is possible to prevent the f-number at the telescopic end from becoming large to cause a rise in temperature due to the vignetting in the aperture stop.

According to still another aspect of the invention, in the second lens group, the negative lens having the concave surface facing to the enlargement side and the positive lens having the convex surface facing to the reduction side are a cemented lens.

According to still another aspect of the invention, the second lens group is constituted by four lenses, namely a positive lens having a convex surface facing to the enlargement side, a negative lens having a concave surface facing to the enlargement side, a positive lens having a convex surface facing to the reduction side, and a positive lens having a convex surface facing to the enlargement side arranged in this order from the enlargement side, and defining a focal length of the second lens group as f2, the following conditional formula (3) is fulfilled.

$$1.5<f2/fw<3.5 \qquad (3)$$

According to still another aspect of the invention, defining a curvature radius of a surface on the most enlargement side of the second lens group as R1, and a curvature radius of a surface on the most reduction side as R2, the following conditional formula (4) is fulfilled.

$$0.5<|R1/R2|<2.0 \qquad (4)$$

The conditional formula (4) is the condition related to the curvature radius of the second lens group. The second lens group has the largest displacement when zooming, and mainly has a role of the magnification change, and therefore has high positive power. Further, in order to efficiently acquire the light beam dispersed by the first lens group, and at the same time obtain the preferable telecentric characteristic in the subsequent third lens group, the second lens group is required to have a surface relatively high in power as the surface on the most enlargement side and the surface on the most reduction side. Therefore, by setting the curvature radius in each of the surface on the most enlargement side and the surface on the most reduction side within the range of the conditional formula (4), it becomes possible to correct the various aberrations in a balanced manner. By exceeding the lower limit of the conditional formula (4), the curvature radius of the surface on the most enlargement side of the second lens group is prevented from becoming too small compared to the surface on the most reduction side, and thus it is possible to prevent the suppression of the spherical aberration and the coma aberration to a low level from becoming difficult, and it becomes possible to obtain a sufficient contrast. In contrast, by setting a value not exceeding the upper limit of the conditional formula (4), the curvature radius of the surface on the most enlargement side of the second lens group is prevented from becoming too large compared to the surface on the most reduction side, and it becomes possible to correct the astigmatism in the magnification change in a balanced manner, and thus it is possible to keep the flatness of the image surface in good condition.

According to still another aspect of the invention, the first lens group includes at least one aspherical lens formed of resin, and having negative power, and defining a focal length of the resin aspherical lens as fp, the following conditional formula (5) is fulfilled.

$$2.5<|fp/fw|<6.0 \qquad (5)$$

The resin lens is easily affected by a variation in environment such as temperature, and by limiting the focal length, in other words, the power of the resin lens within the range of the conditional formula (5), it becomes possible to obtain a good performance while reducing the influence of the environmental variation as much as possible.

A projection type image display device according to an aspect of the invention is equipped with the projection zoom lens described above.

The projection type image display device is equipped with the projection zoom lens described above, and is therefore capable of projecting a high quality image due to the projection zoom lens, which is bright, relatively large in field angle, compact, and low in cost.

BRIEF DESCRIPTION OF THE DRAWINGS

The invention will be described with reference to the accompanying drawings, wherein like numbers reference like elements.

DESCRIPTION OF AN EXEMPLARY EMBODIMENT

A projection zoom lens according to an embodiment of the invention and a projector (a projection type image display device) incorporating the projection zoom lens will hereinafter be described with reference to the accompanying drawings.

Figure 1:
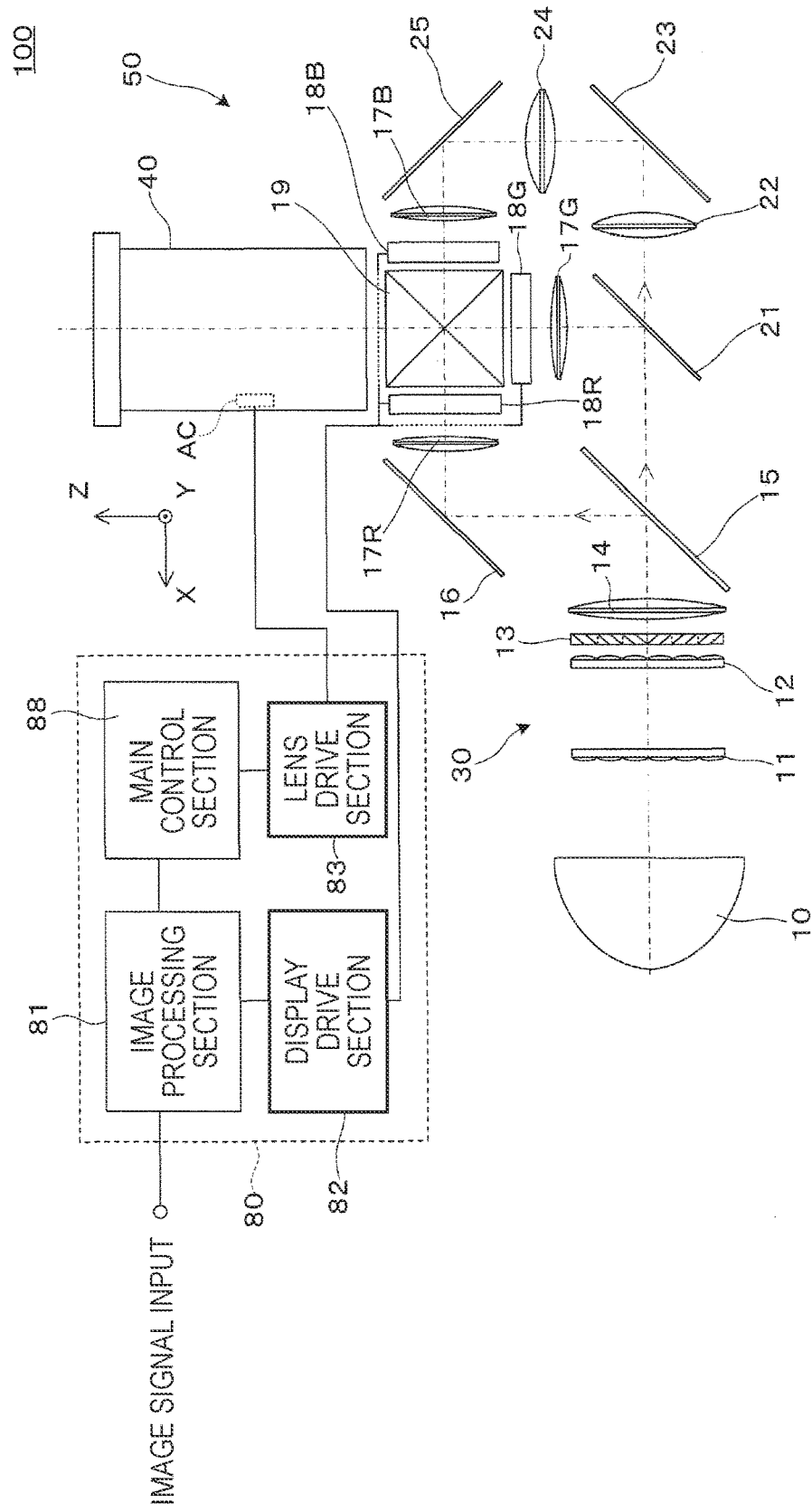
FIG. 1 is a diagram showing a schematic configuration of a projector incorporating a projection zoom lens according to an embodiment of the invention.

As shown in FIG. 1, the projector 100 as the projection type image display device incorporating the projection zoom lens according to an embodiment of the invention is provided with an optical system part 50 for projecting image light, and a circuit device 80 for controlling an operation of the optical system part 50.

In the optical system part 50, a light source 10 is, for example, a super-high pressure mercury lamp, and emits light including R light, G light, and B light. Here, the light source 10 can be a discharge light source other than the super-high pressure mercury lamp, or can also be a solid-state light source such as an LED or a laser. A first integrator lens 11 and a second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12. The lens elements of the second integrator lens 12 forms the images of the respective lens elements of the first integrator lens 11 on liquid crystal panels 18R, 18G, and 18B in cooperation with an overlapping lens 14. According to such a configuration, the light from the light source 10 illuminates the whole of a display area of each of the liquid crystal panels 18R, 18G, and 18B with roughly even luminance.

A polarization conversion element 13 converts the light from the second integrator lens 12 into predetermined linearly polarized light. The overlapping lens 14 overlaps the images of the respective lens elements of the first integrator lens 11 on the display area of each of the liquid crystal panels 18R, 18G, and 18B via the second integrator lens 12.

A first dichroic mirror 15 reflects the R light input from the overlapping lens 14, and transmits the G light and the B light. The R light reflected by the first dichroic mirror 15 enters the liquid crystal panel 18R as a light modulation element via a reflecting mirror 16 and a field lens 17R. The liquid crystal panel 18R modulates the R light in accordance with the image signal to thereby form an R color image.

The second dichroic mirror 21 reflects the G light from the first dichroic mirror 15, and transmits the B light. The G light reflected by the second dichroic mirror 21 enters the liquid crystal panel 18G as a light modulation device via a field lens 17G. The liquid crystal panel 18R modulates the G light in accordance with the image signal to thereby form a G color image. The B light transmitted through the second dichroic mirror 21 enters the liquid crystal panel 18B as a light modulation device via relay lenses 22, 24, reflecting mirrors 23, 25, and a field lens 17B. The liquid crystal panel 18B modulates the B light in accordance with the image signal to thereby form a B color image.

A cross prism (a cross dichroic prism) 19 combines the light modulated by the respective liquid crystal display panels 18R, 18G, and 18B with each other to form the image light, and makes the image light proceed to a projection zoom lens 40.

The projection zoom lens 40 is a projection optical system for projecting the image light, which is modulated by the liquid crystal panels 18G, 18R, and 18B and then combined by the cross prism (the cross dichroic prism) 19, on a screen not shown in an enlarged manner.

The circuit device 80 is provided with an image processing section 81 to which an external image signal such as a video signal is input, a display drive section 82 for driving the liquid crystal panels 18G, 18R, and 18B provided to the optical system part 50 based on the output of the image processing section 81, a lens drive section 83 for making a drive mechanism (not shown) provided to the projection zoom lens 40 operate to control the state of the projection zoom lens 40, and a main control section 88 for performing overall control of the operations of these circuit sections 81, 82, 83, and so on.

The image processing section 81 converts the external image signal input thereto into the image signal including the tones of the respective colors. It should be noted that it is also possible for the image processing section 81 to perform various image processing such as distortion correction or color correction on the external image signal.

The display drive section 82 is capable of making the liquid crystal panels 18G, 18R, and 18B operate based on the image signal output from the image processing section 81, and thus making the liquid crystal panels 18G, 18R, and 18B form the respective images corresponding to the image signal, or the respective images corresponding to the image signal on which the image processing has been performed.

The lens drive section 83 operates under the control of the main control section 88, and is capable of performing the magnification change and focusing (zoom and focus) in the projection of the image on the screen by the projection zoom lens 40 by arbitrarily moving some of optical elements constituting the projection zoom lens 40 along the optical axis OA via an actuator AC. It should be noted that the lens drive section 83 is also capable of changing the vertical position of the image projected on the screen by controlling a flap for moving the whole of the projection zoom lens 40 in a vertical direction perpendicular to the optical axis OA.

Hereinafter, the projection zoom lens 40 according to the embodiment will specifically be described with reference to FIG. 2. It should be noted that the projection zoom lens 40 illustrated in FIG. 2 and so on has the same configuration as that of a projection zoom lens 41 according to Example 1 described later. For the sake of convenience, a +Y direction is defined as an upward direction, and a −Y direction is defined as a downward direction.

The projection zoom lens 40 according to the embodiment projects the image, which is formed on the liquid crystal panel 18G (18R, 18B), on the screen not shown. Here, between the projection zoom lens 40 and the liquid crystal panel 18G (18R, 18B), there is disposed a prism PR corresponding to the cross dichroic prism 19 shown in FIG. 1.

The projection zoom lens 40 is constituted by three lens groups, namely a first lens group G1 having negative refracting power, a second lens group G2 having positive refracting power, and a third lens group G3 having positive refracting power arranged in this order from the enlargement side.

The first lens group G1 is formed of a lens group (lenses L11 through L13) having a three-lens configuration. Specifically, the first lens group G1 is constituted by the three lenses, namely two negative lenses (the lenses L11, L12) and one positive lens (the lens L13) arranged in this order from the enlargement side.

The second lens group G2 is formed of a lens group having a four-lens configuration or a five-lens configuration, and in the example shown in the drawing, the second lens group G2 is formed of a lens group (lenses L21 through L25) having the five-lens configuration. Specifically, the second lens group G2 has an aperture stop ST, and is constituted by the five lenses, namely one positive lens (the lens L21) located on the enlargement side, namely the projection surface side, of the aperture stop ST, and having a convex surface facing to the enlargement side, a negative lens (the lens L22) having a concave surface facing to the enlargement side, a cemented lens C21 of a negative lens (the lens L23) having a concave surface facing to the enlargement side and a positive lens (the lens L24) having a convex surface facing to the reduction side, and a positive lens (the lens L25) having a convex surface facing to the enlargement side arranged in this order from the enlargement side.

The third lens group G3 is formed of a single positive lens (lens L31) having a convex surface facing to the enlargement side.

The projection zoom lens 40 having the configuration described hereinabove is a zoom lens in which the distance between the first lens group G1 and the second lens group G2, and the distance between the second lens group G2 and the third lens group G3 are changed to thereby perform the magnification change and focusing when performing the zoom and focusing. Among these lens groups, in the second lens group G2, the lens L21 disposed on the most enlargement side is a positive lens having a convex surface higher in power facing to the enlargement side than a surface thereof facing to the reduction side, and the lens L25 disposed on the most reduction side is a positive lens having a convex surface higher in power facing to the reduction side than a surface thereof facing to the enlargement side.

Further, the projection zoom lens 40 satisfies the following conditional formula (1).

$$1.4 < Bf/fw < 2.0 \qquad (1)$$

where fw: focal length of the overall lens system at the wide-angle end

Bf: focal length (air-equivalent length) of the back focus with the prism and other flat plates excluded The conditional formula (1) relates to the back focus. Specifically, the conditional formula (1) is for ensuring a space for making it possible to dispose the cross prism 19 (the prism PR), the polarization plate, other optical members, and so on disposed on the reduction side of the projection zoom lens 40 to be essential for the three-plate type liquid crystal projector, and at the same time, keep appropriate distances therebetween to thereby smoothly performing cooling as in the projector 100 (see FIG. 1) according to the present embodiment. By exceeding the lower limit of the conditional formula (1), it is possible to prevent the back focus from becoming too short, and ensure the sufficient space for disposing the optical members such as the cross prism 19 (the prism PR) on the reduction side, and cooling and so on become easy. Further, by setting a lower value than the upper limit of the conditional formula (1), it is possible to prevent the back focus from becoming too long while ensuring the space, and it is possible to prevent the lens diameter on the reduction side from becoming too large in the case of adopting a roughly telecentric configuration on the reduction side.

Further, as already described, in the first lens group G1 constituted by the two negative lenses (the lenses L11, L12) and the one positive lens (the lens L13), defining the focal length of the first lens group G1 as f1, the following conditional formula (2) is fulfilled.

$$1.5 < |f1/fw| < 3.0 \qquad (2)$$

The first lens group G1 is constituted by the three lenses, namely the two negative lenses (the lenses L11, L12) and the one positive lens (the lens L13), to thereby prevent generation of the preferable distortion aberration and chromatic aberration of magnification even in the wide field angle, and at the same time, have relatively high negative power in order to ensure the long back focus. Further, although the first lens group G1 is provided with a configuration having aspherical lenses for the sake of the aberration correction described above and so on, since the first lens group G1 has a relatively large diameter, it is preferable to use resin lenses as the aspherical lenses. However, in many cases, the resin lens causes a focus shift due to a shape variation or a refractive index variation caused by an environmental variation such as a variation in temperature or humidity. Therefore, it is preferable for the power of the resin lens to be lowered. The conditional formula (2) is related to the power of the first lens group G1, and is for making it possible to provide the sufficient back focus to suppress the generation of the variety of aberrations to a low level. By exceeding the lower limit of the conditional formula (2), it is possible to prevent the negative power of the first lens group G1 from becoming too high, namely the power of the two negative lenses (the lenses L11, L12) from becoming excessively high, and the correction of the chromatic aberration of magnification becomes easy. More specifically, in the case in which one of the two negative lenses (the lenses L11, L12) of the first lens group G1 is formed of the resin lens as described above, it results that the overall negative power is mainly realized by the non-resin lens as the other of the two negative lenses. However, by exceeding the lower limit of the conditional formula (2), it becomes relatively easy to correct the chromatic aberration of magnification generated in the first lens group G1 with the remaining one positive lens (the lens L13). Further, by adopting a value lower than the upper limit of the conditional formula (2), it is possible to prevent the negative power of the first lens group G1 from becoming too low, and therefore, it is possible to prevent the power of the positive lens from becoming too high, and thus, it becomes easy to correct the coma aberration and the distortion aberration in a balanced manner.

Further, the second lens group G2 is constituted by five lenses, namely the positive lens (the lens L21) having a convex surface facing to the enlargement side, the negative lens (the lens L22) having a concave surface facing to the enlargement side, a cemented lens C21 of a negative lens (the lens L23) having a concave surface facing to the enlargement side and a positive lens (the lens L24) having a convex surface facing to the reduction side, and a positive lens (the lens L25) having a convex surface facing to the enlargement side arranged in this order from the enlargement side. Further, defining the focal length of the second lens group G2 as f2, the following conditional formula (3) is fulfilled.

$$1.5 < f2/fw < 3.5 \qquad (3)$$

The conditional formula (3) is the condition related to the power of the second lens group G2. The second lens group G2 mainly gets involved in the magnification change, and has high positive power. When changing the magnification from the wide-angle end to the telescopic end, the magnifying power of the image can be changed by moving the second lens group G2 from the reduction side toward the enlargement side. On this occasion, since the focus shift is caused, by moving the first lens group G1 or the third lens group G3, the focus shift in changing the magnification can be corrected, and thus, the function as the zoom lens can be achieved. By exceeding the lower limit of the conditional formula (3), the positive power of the second lens group G2 is prevented from becoming too high, and thus it is possible to prevent the spherical aberration and the off-axis coma aberration from becoming worse, and thus, it is possible to prevent the coma flare from increasing, and the contrast from decreasing in the entire area of the screen. Therefore, it becomes easy to obtain the bright f-number, and it becomes also easy to ensure the sufficient relative illumination. Further, by adopting a value lower than the upper limit of the conditional formula (3), the positive power of the second lens group G2 is prevented from becoming too low, and thus, it is possible to prevent the displacement of the second lens group G2 from becoming large when changing the magnification, which is preferable from the viewpoint of miniaturization. Further, since it is possible to prevent the displacement of the position of the aperture stop ST in the second lens group G2 from increasing, it is possible to prevent the f-number at the telescopic end from becoming large to cause a rise in temperature due to the vignetting in the aperture stop ST.

Further, in the projection zoom lens 40, defining the curvature radius of the surface (the lens surface on the enlargement side of the lens L21) on the most enlargement side of the second lens group G2 as R1, and the curvature radius of the surface (the lens surface on the reduction side of the lens L25) of the most reduction side as R2, the following conditional formula (4) is satisfied.

$$0.5 < |R1/R2| < 2.0 \qquad (4)$$

The second lens group G2 has the largest displacement when zooming, and mainly has a role of the magnification change, and therefore has high positive power. Further, in order to efficiently acquire the light beam dispersed by the first lens group G1, and at the same time obtain the preferable telecentric characteristic in the subsequent third lens group G3, the second lens group G2 is required to have a surface relatively high in power as the surface on the most enlargement side and the surface on the most reduction side. Therefore, by setting the curvature radius in each of the surface on the most enlargement side and the surface on the most reduction side within the range of the conditional formula (4), it becomes possible to correct the various aberrations in a balanced manner. By exceeding the lower limit of the conditional formula (4), the curvature radius of the surface on the most enlargement side of the second lens group is prevented from becoming too small compared to the surface on the most reduction side, and thus it is possible to prevent the suppression of the spherical aberration and the coma aberration to a low level from becoming difficult, and it becomes possible to obtain a sufficient contrast. In contrast, by setting a value not exceeding the upper limit of the conditional formula (4), the curvature radius of the surface on the most enlargement side of the second lens group G2 is prevented from becoming too large compared to the surface on the most reduction side, and it becomes possible to correct the astigmatism in the magnification change in a balanced manner, and thus it is possible to keep the flatness of the image surface in good condition.

Further, it is common to use the aspherical lens in the first lens group G1 in order to efficiently correct the distortion aberration and the coma aberration as described above. The lens L12 of the first lens group G1 is constituted by the aspherical lens formed of resin, and defining the focal length of the aspherical lens as fp, the following conditional formula (5) is fulfilled.

$$2.5 < |fp/fw| < 6.0 \qquad (5)$$

If the resin lens is used, it is easy to be affected by a variation of the environment such as the temperature, and for example, as the time elapses after performing focusing immediately after lighting the projector, due to the temperature change in the installation environment, heating of the inside of the projector, and so on, there easily occurs the phenomenon that the focal position is displaced.

The conditional formula (5) is related to the power of the resin aspherical lens, and by limiting the focal length, in other words, the power of the resin lens within the range of the conditional formula (5), it becomes possible to obtain sufficient performance while suppressing the influence of the environmental change as small as possible.

By exceeding the lower limit of the conditional formula (5), it is possible to prevent the focal length of the resin aspherical lens from becoming too short, namely to prevent the negative power of the resin aspherical lens from becoming too high, to thereby make it difficult to cause the focal shift due to the environmental temperature, a rise in internal temperature when lighting the projector, and so on. Further, by setting a value not exceeding the upper limit of the conditional formula (5), it is possible to prevent the focal length of the resin aspherical lens from becoming too long, namely to prevent the negative power from becoming too low, to thereby prevent another negative lens constituting the first lens group G1 from being subject to a too much load to achieve a balance of a good image performance while keeping the sufficient back focus.

As described above, in the projection zoom lens 40 according to the present embodiment and the projector 100 as the projection type image display device incorporating the projection zoom lens 40, the first through third lens groups G1 through G3 constituting the projection zoom lens 40 can be configured as a zoom lens of the type in which the first and second lens groups G1, G2, for example, are moved when zooming, and the first lens group G1, for example, is moved when focusing. Further, by exceeding the lower limit of the conditional formula (1), the back focus is prevented from becoming too short to thereby ensure a sufficient space on the reduction side. Further, by setting a lower value than the upper limit of the conditional formula (1), the back focus is prevented from becoming too long while ensuring the space, and it is possible to prevent the lens diameter on the reduction side from becoming too large in the case of adopting a roughly telecentric configuration on the reduction side.

EXAMPLES

Examples of the projection zoom lens 40 will hereinafter be described. The meanings of the specifications common to Examples 1 through 6 described hereinafter are listed below.

f: focal length of the overall system

FNo: f-number

ω: half viewing angle

R: curvature radius

D: axial surface distance (lens thickness or lens distance)

Nd: refractive index of d-line

Vd: Abbe number on d-line

An aspherical surface is specified by the following polynomial expression (an aspherical expression).

$$z = \frac{ch^2}{1 + \sqrt{1-(k+1)c^2h^2}} + A_4h^4 + A_6h^6 + A_8h^8 + A_{10}h^{10} + A_{12}h^{12}$$

where c: curvature factor (1/R)

h: height from the optical axis k: conical coefficient of aspherical surface

Ai: high-order aspherical coefficient of aspherical surface

It should be noted that the surface number 0 denotes the image surface (a projection target surface) on the screen, STO denotes the aperture stop ST, and the final number of the surface number denotes a panel surface PI. Further, the surface provided with "*" described in front of the surface number is a surface having an aspherical shape.

Example 1

Table 1 below shows data of the lens surfaces of Example 1.

TABLE 1

| surface number | R | D | Nd | Vd |
|---|---|---|---|---|
| 0 |  | 1800.000 |  |  |
| 1 | 69.448 | 1.800 | 1.74320 | 49.34 |
| 2 | 20.351 | 2.000 |  |  |
| *3 | 25.000 | 2.200 | 1.53116 | 56.04 |
| *4 | 14.793 | 11.499 |  |  |
| 5 | 36.861 | 3.000 | 1.75520 | 27.51 |
| 6 | 83.782 | variable distance |  |  |
| 7 | 21.576 | 4.600 | 1.69700 | 48.52 |
| 8 | 1225.821 | 8.025 |  |  |
| STO9 | Infinity | 3.600 |  |  |
| *10 | −29.533 | 1.300 | 1.83441 | 37.28 |
| *11 | 864.058 | 2.281 |  |  |
| 12 | −16.990 | 1.000 | 1.74000 | 28.30 |
| 13 | 40.805 | 6.200 | 1.59522 | 67.73 |
| 14 | −19.406 | 0.200 |  |  |
| 15 | 139.432 | 7.000 | 1.62041 | 60.29 |
| 16 | −23.349 | variable distance |  |  |
| 17 | 46.927 | 3.600 | 1.56384 | 60.67 |
| 18 | −375.789 | 6.000 |  |  |
| 19 | Infinity | 25.750 | 1.51680 | 64.20 |
| 20 | Infinity | 3.350 |  |  |
| 21 | Infinity |  |  |  |

Figure 2:
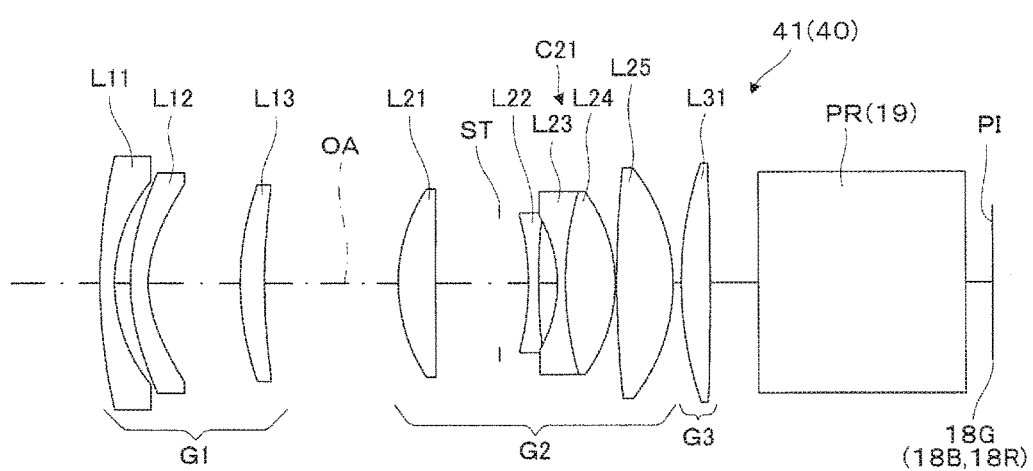
FIG. 2 is a diagram showing a configuration of the projection zoom lens according to the embodiment or Example 1.

Here, FIG. 2 showing an embodiment of the projection zoom lens also corresponds to a cross-sectional view of the projection zoom lens 40 (projection zoom lens 41) according to Example 1.

Table 2 below shows the ranges of the focal length f, the half viewing angle ω, and the f-number FNo of the overall system of the projection zoom lens 40 (the projection zoom lens 41) according to Example 1 including the cases in which the projection zoom lens 40 is changed to the wide-angle end (Wide), an intermediate focal length position (Middle), and the telescopic end (Tele), respectively. Further, Table 2 shows the values of the axial surface distance D at the variable distance parts in the lens surfaces of Example 1 at the wide-angle end, the intermediate focal length position, and the telescopic end, respectively.

TABLE 2 f: 16.9-20.28
FNo: 1.60-1.75
ω: 30.14°-27.21°

| surface number | Wide | Middle | Tele |
|---|---|---|---|
| 6 | 16.611 | 10.701 | 5.775 |
| 16 | 1.000 | 3.725 | 6.450 |

Table 3 below shows the aspherical coefficient of the lens surface of Example 1.

TABLE 3

| surface number | K | A04 | A06 | A08 | A10 | A12 |
|---|---|---|---|---|---|---|
| 3 | 0.0000 | −2.2813E−05 | 0.0000E+00 | 0.0000E+00 | 0.0000E+00 | 0.0000E+00 |
| 4 | −0.1570 | −5.6884E−05 | −1.5082E−07 | 4.6246E−10 | −2.6102E−12 | 0.0000E+00 |
| 10 | −7.4112 | 4.0260E−05 | −1.1765E−06 | 5.8088E−09 | 0.0000E+00 | 0.0000E+00 |
| 11 | 0.0000 | 1.3009E−04 | −1.0703E−06 | 5.1539E−09 | 0.0000E+00 | 0.0000E+00 |

In Table 3 above and the following tables, it is defined that the exponential index (e.g., $1.00 \times 10^{+18}$) is expressed using E (e.g., 1.00E+18).

Figure 3:
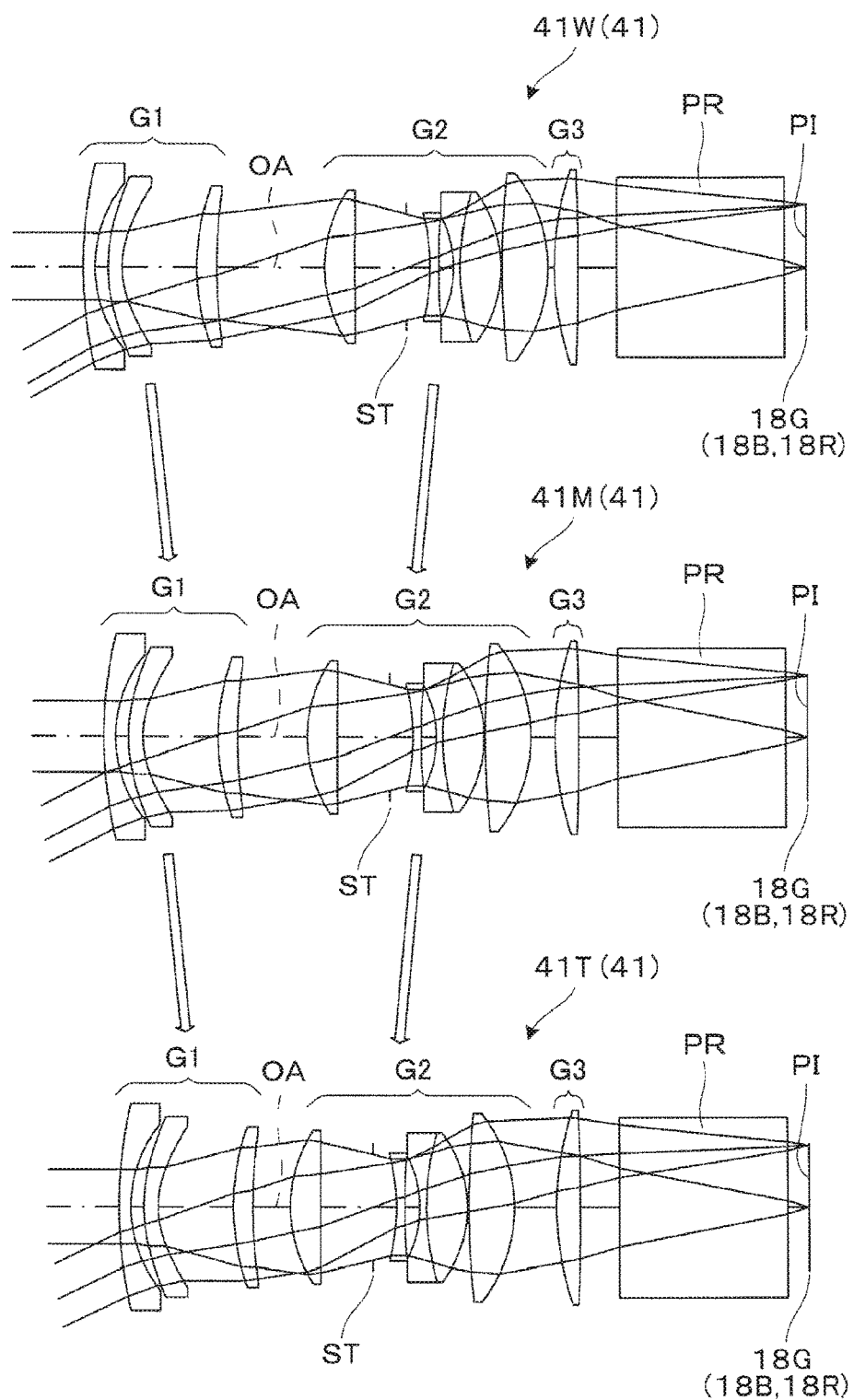
FIG. 3 is a diagram for explaining zoom by an optical system of Example 1.

The projection zoom lens 41 (corresponding to the projection zoom lens 40) according to Example 1 shown in FIG. 2 and FIG. 3 is for projecting the image on the panel surface PI in an enlarged manner with the magnifying power corresponding to the distance to the screen. In particular, in FIG. 3, the state of the lens position at the wide-angle end is shown in the upper area, the state of the lens position at the intermediate focal length position is shown in the middle area, and the state of the lens position at the telescopic end is shown in the lower area. In other words, the upper area shows the lens arrangement of the projection zoom lens 41 (projection zoom lens 41W) in the wide-angle end, the middle area shows the lens arrangement of the projection zoom lens 41 (projection zoom lens 41M) in the intermediate focal length position, and the lower area shows the lens arrangement of the projection zoom lens 41 (projection zoom lens 41T) in the telescopic end. Therefore, it results that FIG. 3, as a whole, shows the condition of the transformation of the projection zoom lens 41 when changing the magnification from the wide-angle end to the telescopic end.

The projection zoom lens 41 is constituted by three lens groups, namely the first lens group G1 having negative refracting power, the second lens group G2 having positive refracting power, and the third lens group G3 having positive refracting power arranged in this order from the enlargement side. As shown in FIG. 3, the third lens group G3 is fixed when zooming and when focusing. In contrast, when zooming from the wide-angle end to the telescopic end, the first lens group G1 moves from the enlargement side toward the reduction side, and the second lens group G2 moves from the reduction side toward the enlargement side. By adopting such a configuration, the miniaturization becomes possible compared to a four-or-more-group zoom lens of the type of adopting the configuration, in which the lens group on the enlargement side is used for focusing, the lens group on the reduction side is used as the stationary group, and the intermediate lens group (the lens group G2) is moved, which is conceivable as, for example, a common four-or-more-group zoom lens.

Hereinafter, going back to FIG. 2, the details of each of the lenses constituting the projection zoom lens 41 will be described.

The first lens group G1 is constituted by the three lenses, namely a first lens (the lens L11) as a negative meniscus lens having a convex surface facing to the enlargement side, a second lens (the lens L12) as a negative meniscus lens having a convex surface facing to the enlargement side, and a third lens (the lens L13) as a positive meniscus lens having a convex surface facing to the enlargement side. Among these lenses, the second lens (the lens L12) is a resin molded lens provided with aspherical surfaces on the both surfaces.

The second lens group G2 is constituted by five lenses, namely a fourth lens (the lens L21) as a positive meniscus lens disposed on the most enlargement side and having a convex surface facing to the enlargement side, a fifth lens (the lens L22) as a biconcave negative lens, the cemented lens C21 of a sixth lens (the lens L23) as a biconcave negative lens and a seventh lens (the lens L24) as a biconvex positive lens, and an eighth lens (the lens L25) as a biconvex positive lens disposed on the most reduction side and having a convex surface higher in power facing to the reduction side than a convex surface facing to the enlargement side. Among these lenses, the fifth lens (the lens L22) is a glass molded lens provided with aspherical surfaces on the both surfaces. It should be noted that the aperture stop ST is disposed between the fourth lens (L21) and the fifth lens (L22).

The third lens group G3 is formed of a single lens, namely a ninth lens (the lens L31) as a positive lens having a convex surface facing to the enlargement side.

Therefore, the projection zoom lens 41 is constituted by the 9 lenses. The nine lenses L11 through L13, L21 through L25, and L31 each have a circular shape axisymmetric about the optical axis OA. Further, among these lenses, the both surfaces of the second lens L12 and the fifth lens L22 are each an aspherical surface. The other surfaces are all spherical surfaces.

In the case described hereinabove, if the first lens group G1 and the second lens group G2 are moved using an interlocking mechanism such as a cam (not shown) when changing the magnification, and the first lens group G1 or the third lens group G3 is used as the focus group independently of this operation, the function as a common zoom lens is achieved. Further, it is also possible to adopt a varifocal zoom (a varifocal type) in which the second lens group G2 is moved alone when changing the magnification, and the focus shift (focus shift due to the magnification change) is performed by the first lens group G1 or the third lens group G3 to thereby make the correction possible.

Figure 4:
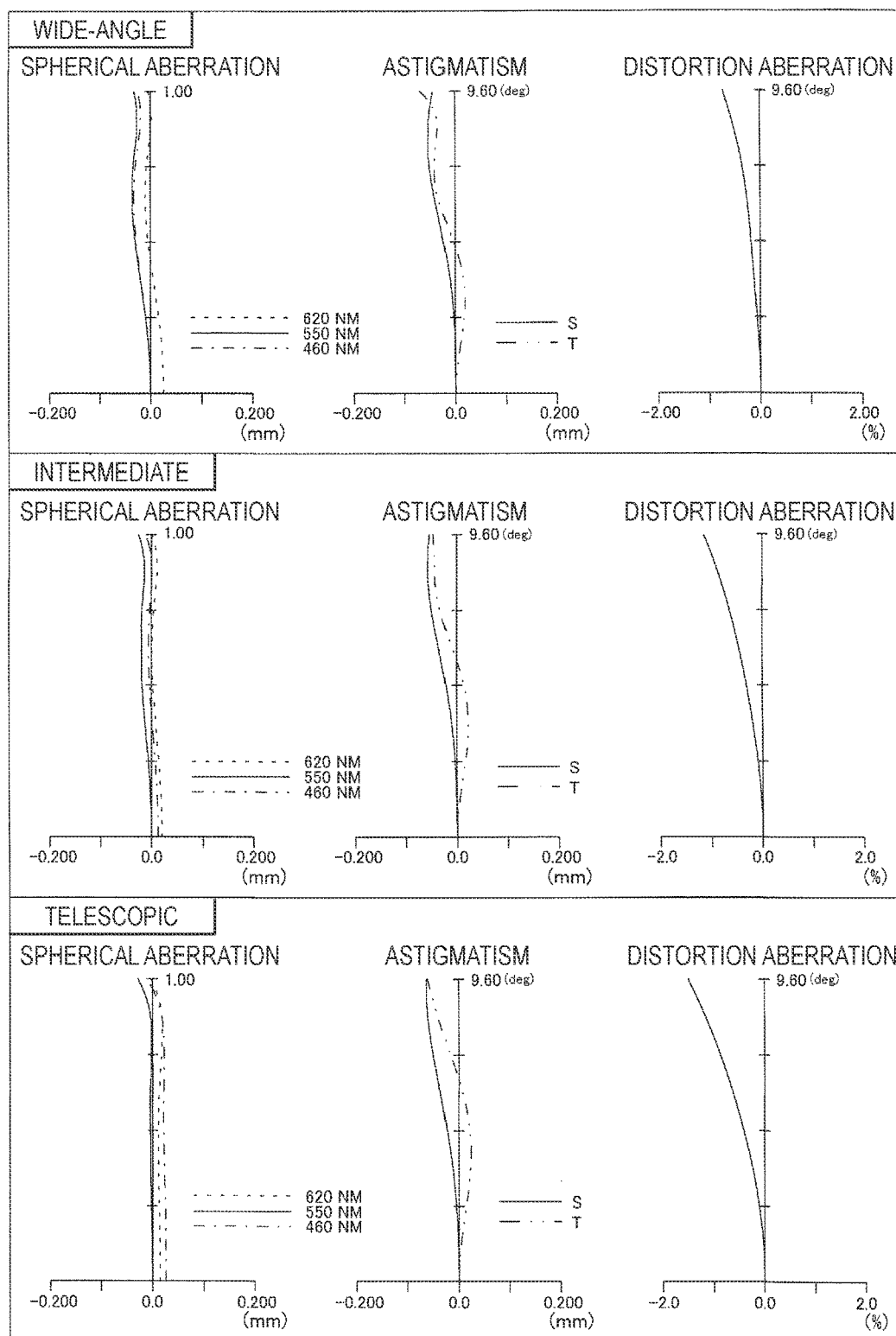
FIG. 4 is a reduction side aberration chart of the projection zoom lens according to Example 1.

FIG. 4 is a reduction g side aberration chart of the projection zoom lens, and as shown in the drawing, the condition of the aberration in the wide-angle end is shown in the upper area, the condition of the aberration in the intermediate focal length position is shown in the middle area, and the condition of the aberration in the telescopic end is shown in the lower area. Further, in each of the areas, the spherical aberration, the astigmatism, and the distortion aberration are shown in this order from the left side. Here, the aberrations at the reference wavelength of 550 nm, and other wavelengths of 620 nm and 460 nm.

Example 2

Table 4 below shows data of the lens surfaces of Example 2.

TABLE 4

| surface number | R | D | Nd | Vd |
|---|---|---|---|---|
| 0 | | 1800.000 | | |
| *1 | 22.577 | 2.200 | 1.53116 | 56.04 |
| *2 | 14.075 | 0.000 | | |
| 3 | −188.832 | 1.500 | 1.66998 | 39.27 |
| 4 | 24.297 | 9.635 | | |
| 5 | 40.873 | 3.000 | 1.76182 | 26.52 |
| 6 | 139.605 | variable distance | | |
| 7 | 25.064 | 4.200 | 1.78590 | 44.20 |
| 8 | 327.769 | 10.000 | | |
| STO9 | Infinity | 5.284 | | |
| *10 | −11.402 | 1.200 | 1.83441 | 37.28 |
| *11 | −18.611 | 1.649 | | |
| 12 | −19.682 | 1.300 | 1.74000 | 28.30 |
| 13 | 62.256 | 5.200 | 1.59522 | 67.73 |
| 14 | −21.779 | 0.200 | | |
| 15 | 146.817 | 7.000 | 1.49700 | 81.54 |
| 16 | −19.569 | variable distance | | |
| 17 | 35.463 | 4.800 | 1.62041 | 60.29 |
| 18 | 984.815 | 6.000 | | |
| 19 | Infinity | 25.750 | 1.51680 | 64.20 |
| 20 | Infinity | 3.350 | | |
| 21 | Infinity | 0.000 | | |

Figure 5:
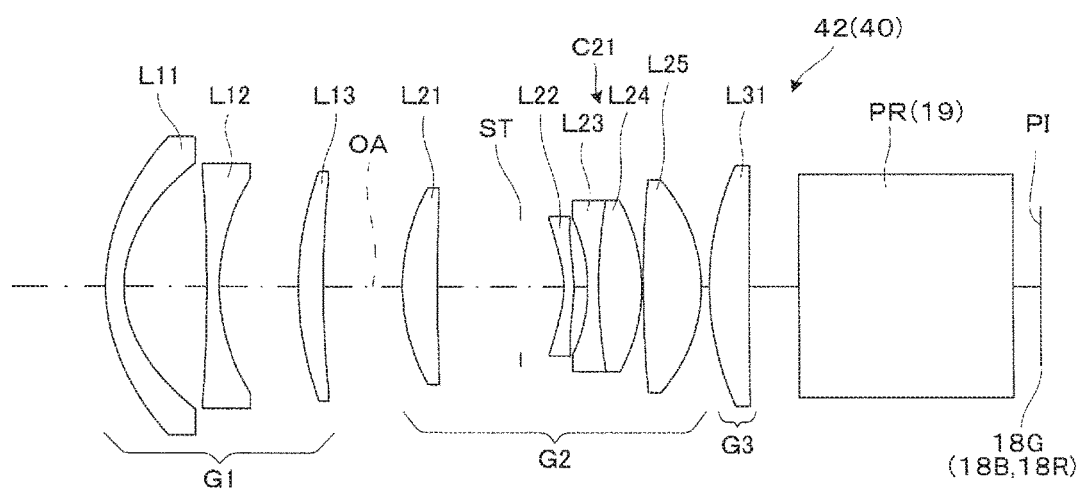
FIG. 5 is a diagram showing a configuration of a projection zoom lens according to Example 2.

Here, FIG. 5 is a cross-sectional view of the projection zoom lens 40 (projection zoom lens 42) according to Example 2.

Table 5 below shows the ranges of the focal length f, the half viewing angle ω, and the f-number FNo of the overall system of the projection zoom lens 40 (the projection zoom lens 42) according to Example 2 including the cases in which the projection zoom lens 40 is changed to the wide-angle end (Wide), an intermediate focal length position (Middle), and the telescopic end (Tele), respectively. Further, Table 5 shows the values of the axial surface distance D at the variable distance parts in the lens surfaces of Example 2 at the wide-angle end, the intermediate focal length position, and the telescopic end, respectively.

TABLE 5

| f: 16.9-20.28 FNo: 1.60-1.70 ω: 30.01°-25.86° | | | |
|---|---|---|---|
| surface number | Wide | Middle | Tele |
| 6 | 9.527 | 5.020 | 1.263 |
| 16 | 1.000 | 5.097 | 9.194 |

Table 6 below shows the aspherical coefficient of the lens surface of Example 2.

TABLE 6

| surface number | K | A04 | A06 | A08 | A10 | A12 |
|---|---|---|---|---|---|---|
| 1 | 0.0000 | −1.4265E−05 | 2.0886E−08 | −6.0231E−11 | 0.0000E+00 | 0.0000E+00 |
| 2 | −0.4340 | −1.7137E−05 | −1.8297E−08 | 5.2501E−11 | −7.2535E−13 | 0.0000E+00 |
| 10 | −4.9583 | 2.1730E−04 | −2.8668E−06 | 1.3734E−08 | −3.7180E−11 | 2.2430E−13 |
| 11 | −11.3316 | 3.4203E−04 | −2.8960E−06 | 1.1572E−08 | 0.0000E+00 | 0.0000E+00 |

Figure 6:
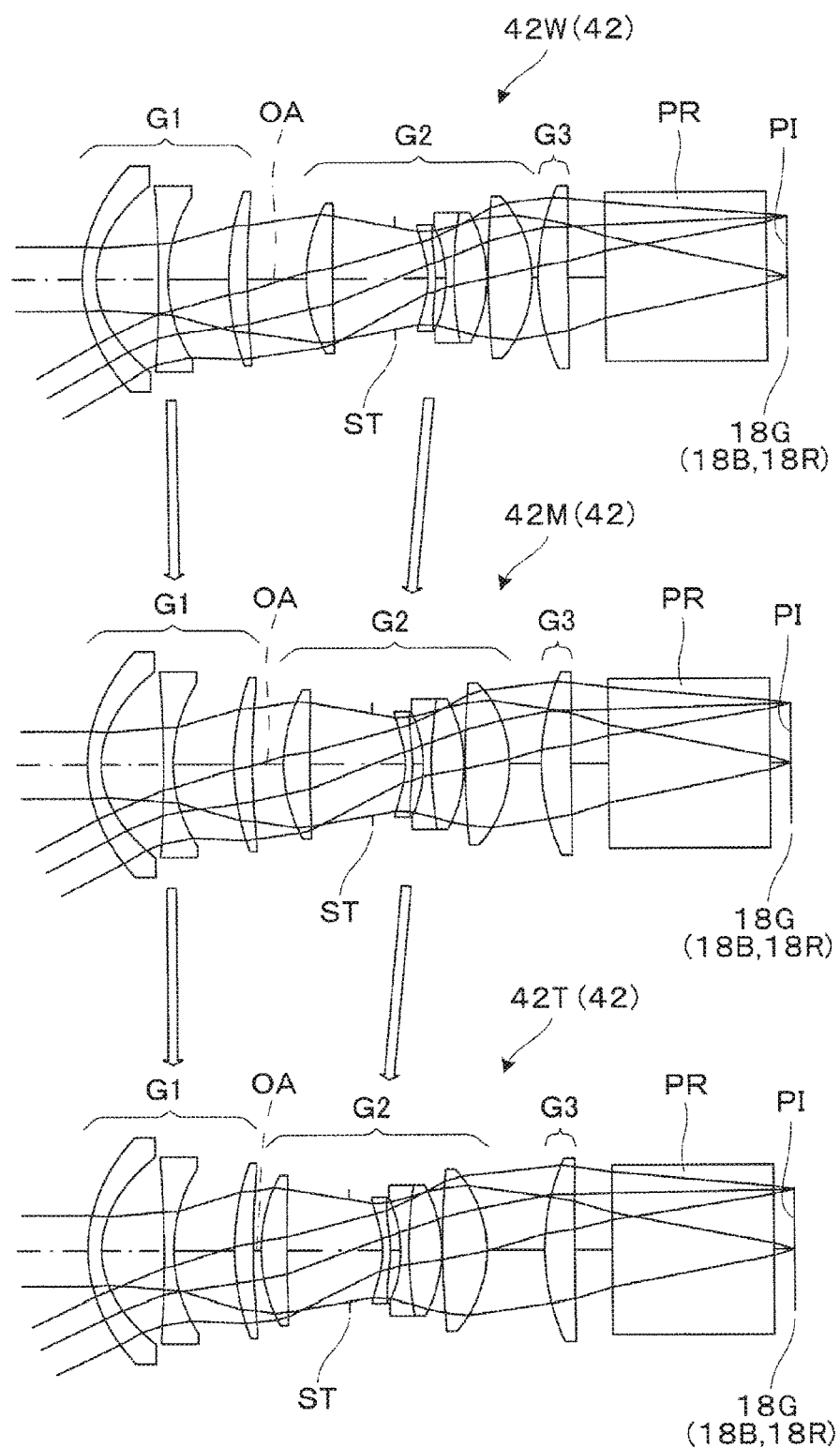
FIG. 6 is a diagram for explaining zoom by an optical system of Example 2.

The projection zoom lens 42 (corresponding to the projection zoom lens 40) according to Example 2 shown in FIG. 5 and FIG. 6 is for projecting the image on the panel surface PI in an enlarged manner with the magnifying power corresponding to the distance to the screen. In particular, similarly to the case shown in FIG. 3 in Example 1, in FIG. 6, the upper area shows the projection zoom lens 42 (projection zoom lens 42W) in the wide-angle end, the middle area shows the projection zoom lens 42 (projection zoom lens 42M) in the intermediate focal length position, and the lower area shows the projection zoom lens 42 (projection zoom lens 42T) in the telescopic end, and FIG. 6 shows, as a whole, the condition of the transformation of the projection zoom lens 42 when changing the magnification from the wide-angle end to the telescopic end.

The projection zoom lens 42 is constituted by three lens groups, namely the first lens group G1 having negative refracting power, the second lens group G2 having positive refracting power, and the third lens group G3 having positive refracting power arranged in this order from the enlargement side. As shown in FIG. 6, the third lens group G3 is fixed when zooming and when focusing. In contrast, when zooming from the wide-angle end to the telescopic end, the first lens group G1 and the second lens group G2 move. Specifically, the first lens group G1 firstly moves toward the reduction side from the wide-angle end up to the intermediate focal length position, but moves toward the enlargement side from the intermediate focal length position through the telescopic end. In contrast, the second lens group G2 moves toward the enlargement side when zooming from the wide-angle end to the telescopic end. As described above, when changing the magnification from the wide-angle end to the telescopic end, regarding the first lens group G1, when changing the magnification from the wide-angle end to the intermediate focal length position, a movement from the enlargement side toward the reduction side is performed, and when changing the magnification from the intermediate focal distance position to the telescopic end, a movement toward the enlargement side is performed. In other words, by drawing the movement locus so as to make the first lens group G1 turn around in the middle, even in the case of performing the zoom only with the first lens group G1 and the second lens group G2, it is possible to reduce the shift of the focal position, and make zooming and focusing easy.

Hereinafter, going back to FIG. 5, the details of each of the lenses constituting the projection zoom lens 42 will be described.

The first lens group G1 is constituted by the three lenses, namely the first lens (the lens L11) as a negative meniscus lens having a convex surface facing to the enlargement side, the second lens (the lens L12) as a biconcave negative lens, and the third lens (the lens L13) as a positive meniscus lens having a convex surface facing to the enlargement side. Among these lenses, the first lens (the lens L11) is a resin molded lens provided with aspherical surfaces on the both surfaces.

The second lens group G2 is constituted by five lenses, namely the fourth lens (the lens L21) as a positive meniscus lens disposed on the most enlargement side and having a convex surface facing to the enlargement side, the fifth lens (the lens L22) as a negative meniscus lens having a concave surface facing to the enlargement side, the cemented lens C21 of the sixth lens (the lens L23) as a biconcave negative lens and the seventh lens (the lens L24) as a biconvex positive lens, and the eighth lens (the lens L25) as a biconvex positive lens disposed on the most reduction side and having a convex surface higher in power facing to the reduction side than a convex surface facing to the enlargement g side. Among these lenses, the fifth lens (the lens L22) is a glass molded lens provided with aspherical surfaces on the both surfaces. It should be noted that the aperture stop ST is disposed between the fourth lens (L21) and the fifth lens (L22).

The third lens group G3 is formed of a single lens, namely the ninth lens (the lens L31) as a positive lens having a convex surface facing to the enlargement side.

Therefore, the projection zoom lens 42 is constituted by the 9 lenses. The nine lenses L11 through L13, L21 through L25, and L31 each have a circular shape axisymmetric about the optical axis OA. Further, among these lenses, the both surfaces of the first lens L11 and the fifth lens L22 are each an aspherical surface. The other surfaces are all spherical surfaces.

Figure 7:
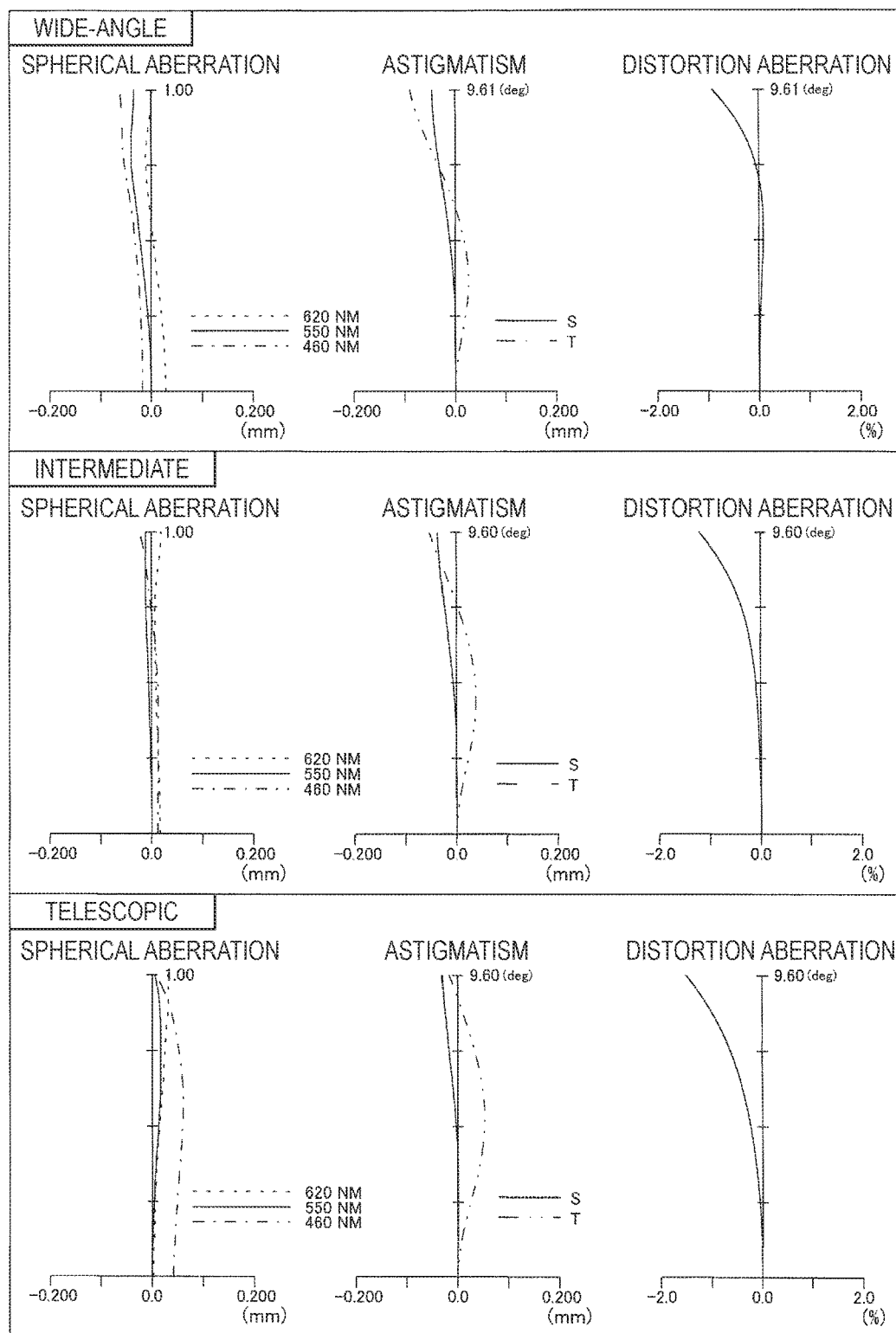
FIG. 7 is a reduction side aberration chart of the projection zoom lens according to Example 2.

FIG. 7 is a reduction side aberration chart of the projection zoom lens, and as shown in the drawing, the condition of the aberration in the wide-angle end is shown in the upper area, the condition of the aberration in the intermediate focal length position is shown in the middle area, and the condition of the aberration in the telescopic end is shown in the lower area. Further, in each of the areas, the spherical aberration, the astigmatism, and the distortion aberration are shown in this order from the left side.

Example 3

Table 7 below shows data of the lens surfaces of Example 3.

TABLE 7

| surface number | R | D | Nd | Vd |
|---|---|---|---|---|
| 0 | | 1800.000 | | |
| 1 | 42.958 | 1.800 | 1.74320 | 49.34 |
| 2 | 17.378 | 5.048 | | |
| *3 | 23.527 | 2.200 | 1.53116 | 56.04 |
| *4 | 13.929 | 13.020 | | |
| 5 | 41.582 | 3.000 | 1.67270 | 32.10 |
| 6 | 141.880 | variable distance | | |
| 7 | 23.046 | 4.300 | 1.78590 | 44.20 |
| 8 | 84.433 | 10.000 | | |
| STO9 | Infinity | 6.630 | | |
| *10 | −10.117 | 1.200 | 1.83441 | 37.28 |
| *11 | −14.658 | 0.829 | | |
| 12 | −22.587 | 1.300 | 1.75520 | 27.51 |
| 13 | 63.856 | 0.100 | | |
| 14 | 69.186 | 4.400 | 1.59522 | 67.73 |
| 15 | −29.359 | 0.200 | | |
| 16 | 325.331 | 7.000 | 1.49700 | 81.54 |
| 17 | −16.969 | variable distance | | |
| 18 | 31.996 | 4.200 | 1.62041 | 60.29 |
| 19 | 312.595 | variable distance | | |
| 20 | Infinity | 25.750 | 1.51680 | 64.20 |
| 21 | Infinity | 3.350 | | |
| 22 | Infinity | | | |

Figure 8:
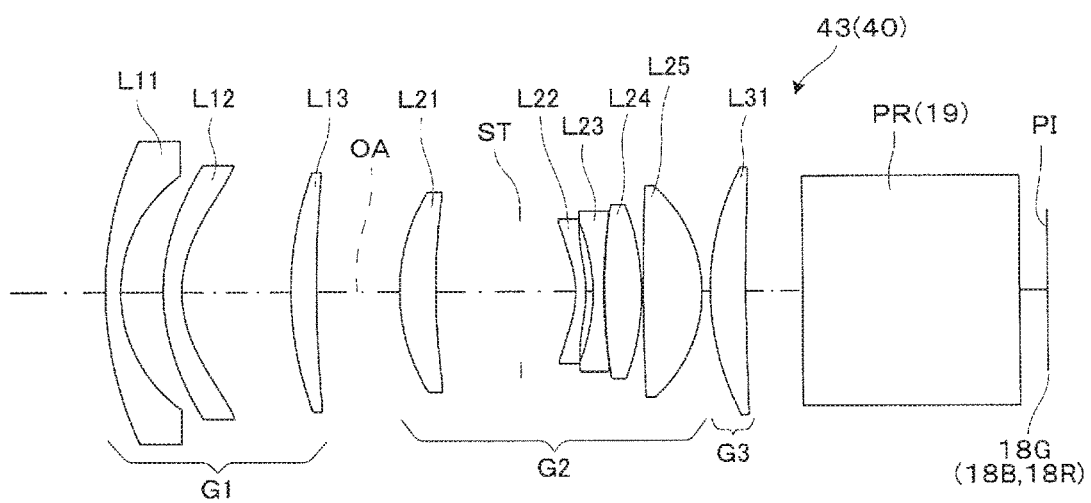
FIG. 8 is a diagram showing a configuration of a projection zoom lens according to Example 3.

Here, FIG. 8 is a cross-sectional view of the projection zoom lens 40 (projection zoom lens 43) according to Example 3.

Table 8 below shows the ranges of the focal length f, the half viewing angle ω, and the f-number FNo of the overall system of the projection zoom lens 40 (the projection zoom lens 43) according to Example 3 including the cases in which the projection zoom lens 40 is changed to the wide-angle end (Wide), an intermediate focal length position (Middle), and the telescopic end (Tele), respectively. Further, Table 8 shows the values of the axial surface distance D at the variable distance parts in the lens surfaces of Example 3 at the wide-angle end, the intermediate focal length position, and the telescopic end, respectively.

TABLE 8 f: 16.9-20.28
FNo: 1.60-1.74
ω: 29.54°-25.69°

| surface number | Wide | Middle | Tele |
|---|---|---|---|
| 6 | 9.911 | 5.247 | 1.008 |
| 17 | 0.994 | 5.994 | 10.373 |
| 19 | 6.767 | 6.431 | 6.291 |

Table 9 below shows the aspherical coefficient of the lens surface of Example 3.

TABLE 9

| surface number | K | A04 | A06 | A08 | A10 | A12 |
|---|---|---|---|---|---|---|
| 3 | 0.0000 | −1.5508E−05 | 0.0000E+00 | 0.0000E+00 | 0.0000E+00 | 0.0000E+00 |
| 4 | −2.4016 | 4.2318E−05 | −2.7338E−07 | 7.1387E−10 | −1.4059E−12 | 0.0000E+00 |
| 10 | −3.7512 | 2.2219E−04 | −1.5765E−06 | −1.4739E−08 | 2.2127E−10 | −8.2619E−13 |
| 11 | −1.8239 | 5.0496E−04 | −3.6815E−06 | 1.2161E−08 | 0.0000E+00 | 0.0000E+00 |

Figure 9:
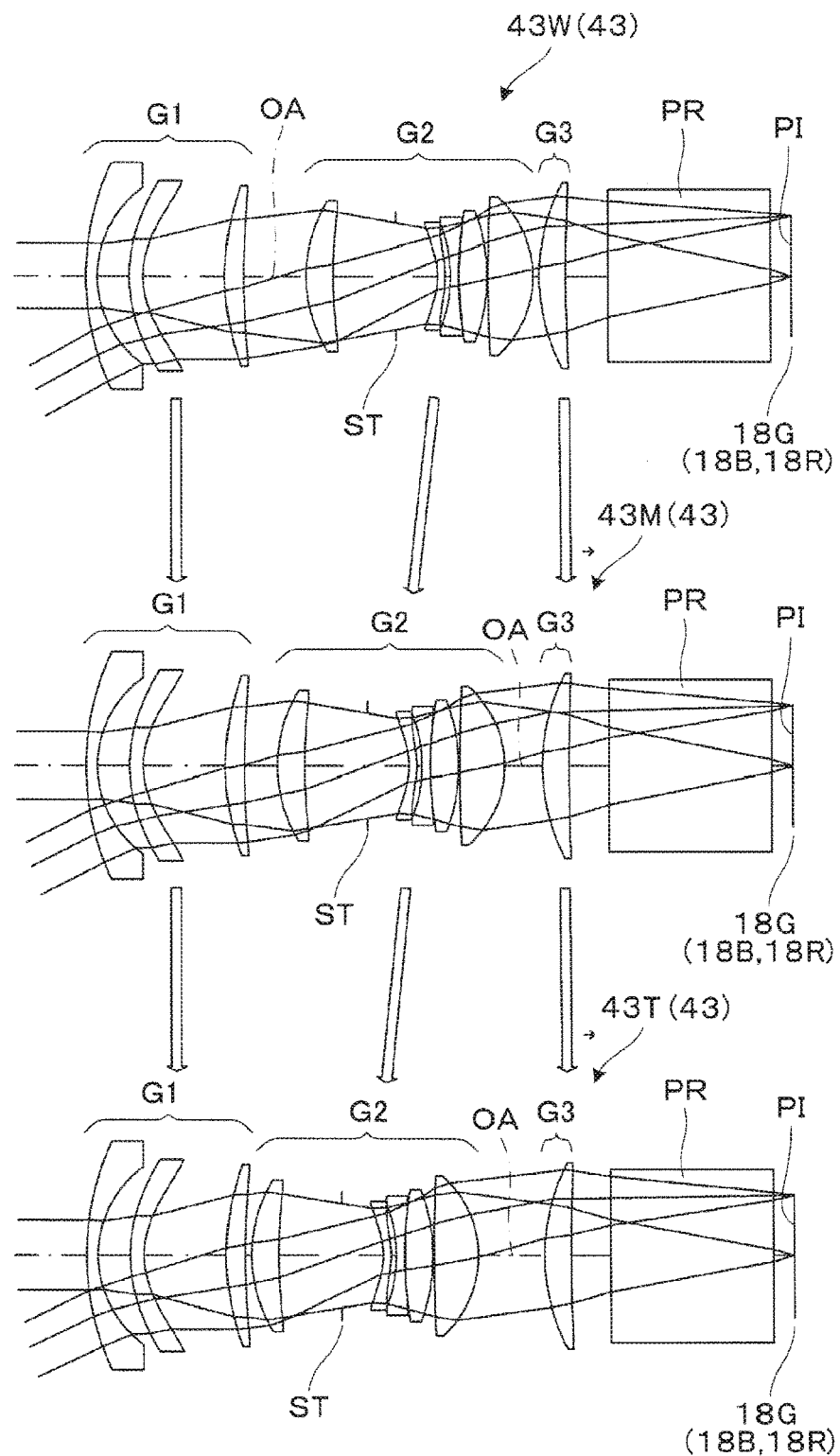
FIG. 9 is a diagram for explaining zoom by an optical system of Example 3.

The projection zoom lens 43 (corresponding to the projection zoom lens 40) according to Example 3 shown in FIG. 8 and FIG. 9 is for projecting the image on the panel surface PI in an enlarged manner with the magnifying power corresponding to the distance to the screen. In particular, similarly to the case shown in FIG. 3 and so on in Example 1, in FIG. 9, the upper area shows the projection zoom lens 43 (projection zoom lens 43W) in the wide-angle end, the middle area shows the projection zoom lens 43 (projection zoom lens 43M) in the intermediate focal length position, and the lower area shows the projection zoom lens 43 (projection zoom lens 43T) in the telescopic end, and FIG. 9 shows, as a whole, the condition of the transformation of the projection zoom lens 43 when changing the magnification from the wide-angle end to the telescopic end.

The projection zoom lens 43 is constituted by three lens groups, namely the first lens group G1 having negative refracting power, the second lens group G2 having positive refracting power, and the third lens group G3 having positive refracting power arranged in this order from the enlargement side. As shown in FIG. 9, the first lens group G1 is fixed (or practically semi-fixed) when zooming and when focusing. In contrast, when zooming from the wide-angle end to the telescopic end, the second lens group G2 moves toward the enlargement side, and the third lens group G3 moves toward the reduction side. In this case, the miniaturization becomes possible compared to a common four-or-more-group zoom lens described above.

Hereinafter, going back to FIG. 8, the details of each of the lenses constituting the projection zoom lens 43 will be described.

The first lens group G1 is constituted by the three lenses, namely the first lens (the lens L11) as a negative meniscus lens having a convex surface facing to the enlargement side, the second lens (the lens L12) as a negative meniscus lens having a convex surface facing to the enlargement side, and the third lens (the lens L13) as a positive meniscus lens having a convex surface facing to the enlargement side. Among these lenses, the second lens (the lens L12) is a resin molded lens provided with aspherical surfaces on the both surfaces.

The second lens group G2 is constituted by five lenses, namely the fourth lens (the lens L21) as a positive meniscus lens disposed on the most enlargement side and having a convex surface facing to the enlargement side, the fifth lens (the lens L22) as a negative meniscus lens having a concave surface facing to the enlargement side, the sixth lens (the lens L23) as a biconcave negative lens, the seventh lens (the lens L24) as a biconvex positive lens, and the eighth lens (the lens L25) as a biconvex positive lens disposed on the most reduction side and having a convex surface higher in power facing to the reduction side than a convex surface facing to the enlargement side. Among these lenses, the fifth lens (the lens L22) is a glass molded lens provided with aspherical surfaces on the both surfaces. It should be noted that the aperture stop ST is disposed between the fourth lens (L21) and the fifth lens (L22).

The third lens group G3 is formed of a single lens, namely the ninth lens (the lens L31) as a positive lens having a convex surface facing to the enlargement side.

Therefore, the projection zoom lens 43 is constituted by the 9 lenses. The nine lenses L11 through L13, L21 through L25, and L31 each have a circular shape axisymmetric about the optical axis OA. Further, among these lenses, the both surfaces of the second lens L12 and the fifth lens L22 are each an aspherical surface. The other surfaces are all spherical surfaces.

Figure 10:
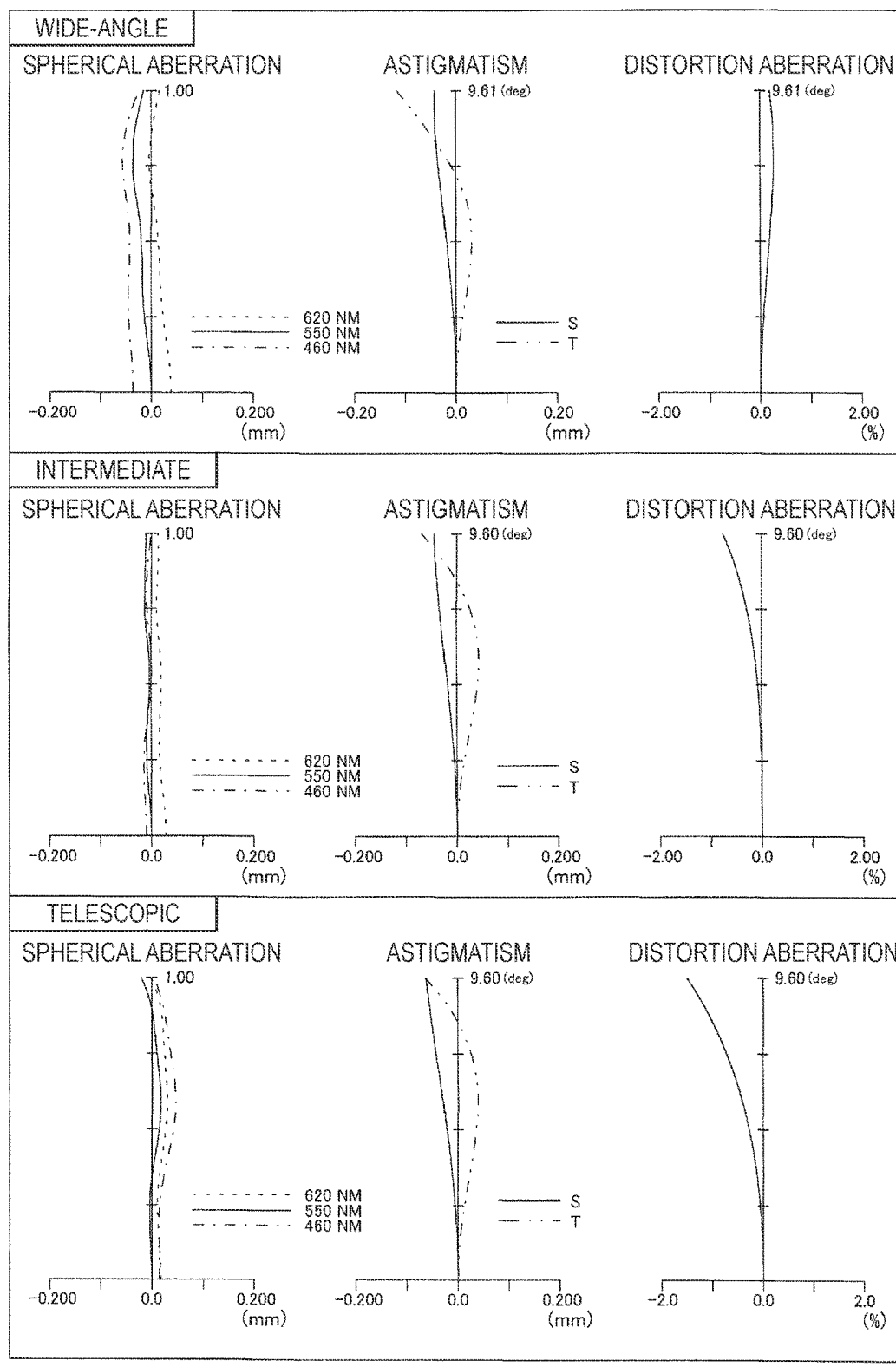
FIG. 10 is a reduction side aberration chart of the projection zoom lens according to Example 3.

FIG. 10 is a reduction side aberration chart of the projection zoom lens, and as shown in the drawing, the condition of the aberration in the wide-angle end is shown in the upper area, the condition of the aberration in the intermediate focal length position is shown in the middle area, and the condition of the aberration in the telescopic end is shown in the lower area. Further, in each of the areas, the spherical aberration, the astigmatism, and the distortion aberration are shown in this order from the left side.

Example 4

Table 10 below shows data of the lens surfaces of Example 4.

TABLE 10

| surface number | R | D | Nd | Vd |
|---|---|---|---|---|
| 0 | | 1800 | | |
| *1 | 39.246 | 2.200 | 1.53116 | 56.04 |
| *2 | 17.782 | 6.747 | | |
| 3 | −63.838 | 1.500 | 1.80100 | 34.97 |
| 4 | 27.213 | 6.296 | | |
| 5 | 49.049 | 5.200 | 1.72825 | 28.46 |
| 6 | −74.580 | variable distance | | |
| 7 | 23.537 | 4.600 | 1.63854 | 55.38 |

TABLE 10-continued

| surface number | R | D | Nd | Vd |
|---|---|---|---|---|
| 8 | −1900.229 | 13.039 | | |
| STO9 | Infinity | 2.800 | | |
| *10 | −12.005 | 1.200 | 1.83220 | 40.10 |
| *11 | −18.458 | 1.474 | | |
| 12 | −14.900 | 1.300 | 1.76182 | 26.52 |
| 13 | −135.656 | 4.800 | 1.59522 | 67.73 |
| 14 | −15.820 | 0.200 | | |
| 15 | 208.758 | 7.200 | 1.49700 | 81.54 |
| 16 | −19.130 | variable distance | | |
| 17 | 53.418 | 3.800 | 1.62041 | 60.29 |
| 18 | −2354.845 | 6.000 | | |
| 19 | Infinity | 25.750 | 1.51680 | 64.20 |
| 20 | Infinity | 3.350 | | |
| 21 | Infinity | | | |

Figure 11:
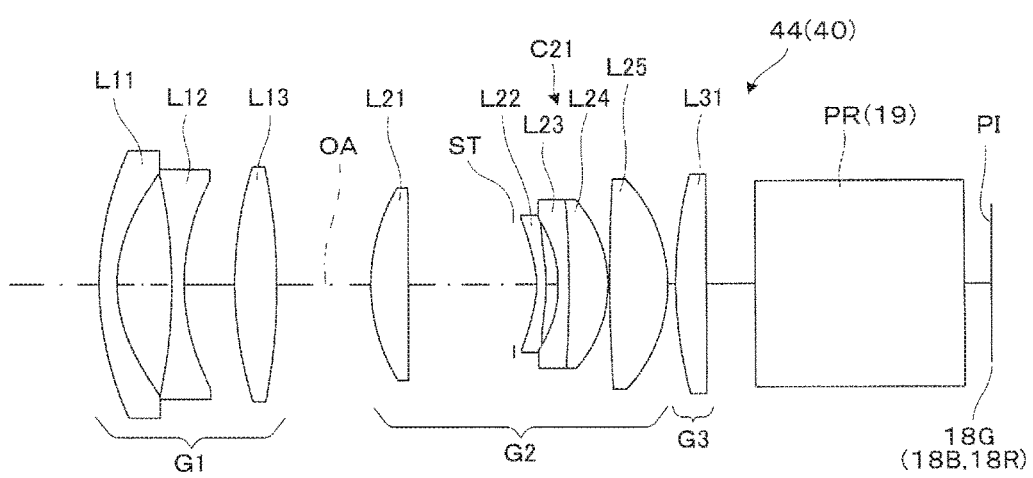
FIG. 11 is a diagram showing a configuration of a projection zoom lens according to Example 4.

Here, FIG. 11 is a cross-sectional view of the projection zoom lens 40 (projection zoom lens 44) according to Example 4.

Table 11 below shows the ranges of the focal length f, the half viewing angle ω, and the f-number FNo of the overall system of the projection zoom lens 40 (projection zoom lens 44) in Example 4 including the cases in which the projection zoom lens 40 is changed to the wide-angle end (Wide), an intermediate focal length position (Middle), and the telescopic end (Tele), respectively. Further, Table 11 shows the values of the axial surface distance D at the variable distance parts in the lens surfaces of Example 4 at the wide-angle end, the intermediate focal length position, and the telescopic end, respectively.

TABLE 11 f: 16.9-20.28
FNo: 1.60-1.72
ω: 30.16°-25.88°

| surface number | Wide | Middle | Tele |
|---|---|---|---|
| 6 | 12.521 | 6.262 | 1.047 |
| 16 | 1.000 | 3.598 | 6.197 |

Table 12 below shows the aspherical coefficient of the lens surface of Example 4.

TABLE 12

| surface number | K | A04 | A06 | A08 | A10 | A12 |
|---|---|---|---|---|---|---|
| 1 | 0.0000 | 2.2692E−06 | −3.1379E−08 | 7.1340E−11 | 0.0000E+00 | 0.0000E+00 |
| 2 | −0.4943 | −3.8315E−06 | −7.8162E−08 | −1.5588E−11 | 2.3954E−13 | 0.0000E+00 |
| 10 | −3.6972 | 2.1313E−04 | −2.9179E−06 | 1.7048E−08 | −1.3996E−10 | 8.0145E−13 |
| 11 | −7.1228 | 3.1121E−04 | −2.2787E−06 | 6.8914E−09 | 0.0000E+00 | 0.0000E+00 |

Figure 12:
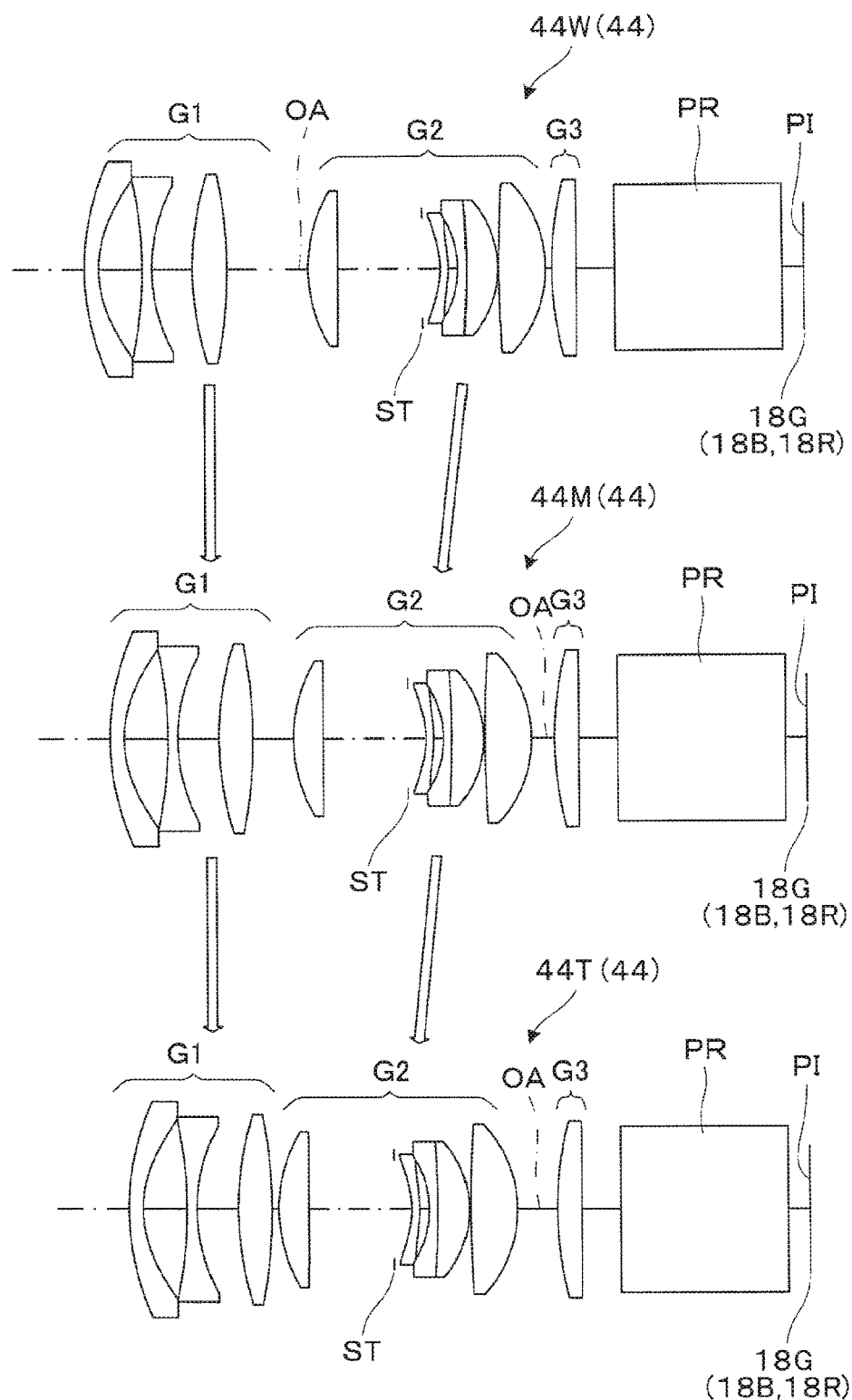
FIG. 12 is a diagram for explaining zoom by an optical system of Example 4.

The projection zoom lens 44 (corresponding to the projection zoom lens 40) according to Example 4 shown in FIG. 11 and FIG. 12 is for projecting the image on the panel surface PI in an enlarged manner with the magnifying power corresponding to the distance to the screen. In particular, similarly to the case shown in FIG. 3 and so on in Example 1, in FIG. 12, the upper area shows the projection zoom lens 44 (projection zoom lens 44W) in the wide-angle end, the middle area shows the projection zoom lens 44 (projection zoom lens 44M) in the intermediate focal length e position, and the lower area shows the projection zoom lens 44 (projection zoom lens 44T) in the telescopic end, and FIG. 12 shows, as a whole, the condition of the transformation of the projection zoom lens 44 when changing the magnification from the wide-angle end to the telescopic end.

The projection zoom lens 44 is constituted by three lens groups, namely the first lens group G1 having negative refracting power, the second lens group G2 having positive refracting power, and the third lens group G3 having positive refracting power arranged in this order from the enlargement side. As shown in FIG. 12, the third lens group G3 is fixed when zooming and when focusing. In contrast, when zooming from the wide-angle end to the telescopic end, the first lens group G1 moves toward the reduction side, and the second lens group G2 moves toward the enlargement side.

Hereinafter, going back to FIG. 11, the details of each of the lenses constituting the projection zoom lens 44 will be described.

The first lens group G1 is constituted by the three lenses, namely the first lens (the lens L11) as a negative meniscus lens having a convex surface facing to the enlargement side, the second lens (the lens L12) as a biconcave negative lens, and the third lens (the lens L13) as a biconvex positive lens. Among these lenses, the first lens (the lens L11) is a resin molded lens provided with aspherical surfaces on the both surfaces.

The second lens group G2 is constituted by five lenses, namely the fourth lens (the lens L21) as a biconvex positive lens disposed on the most enlargement side and having a convex surface higher in power facing to the enlargement side than a convex surface on facing to the reduction side, the fifth lens (the lens L22) as a negative meniscus lens having a concave surface facing to the enlargement side, the cemented lens C21 of the sixth lens (the lens L23) as a negative meniscus lens having a concave surface facing to the enlargement side and the seventh lens (the lens L24) as a positive meniscus lens having a concave surface facing to the enlargement side, and the eighth lens (the lens L25) as a biconvex lens disposed on the most reduction side and having a convex surface higher in power facing to the reduction side than a convex surface facing to the enlargement side. Among these lenses, the fifth lens (the lens L22) is a glass molded lens provided with aspherical surfaces on the both surfaces. It should be noted that the aperture stop ST is disposed between the fourth lens (L21) and the fifth lens (L22).

The third lens group G3 is formed of a single lens, namely the ninth lens (the lens L31) as a positive lens having a convex surface facing to the enlargement side.

Therefore, the projection zoom lens 44 is constituted by the 9 lenses. The nine lenses L11 through L13, L21 through L25, and L31 each have a circular shape axisymmetric about the optical axis OA. Further, among these lenses, the both surfaces of the first lens L11 and the fifth lens L22 are each an aspherical surface. The other surfaces are all spherical surfaces.

Figure 13:
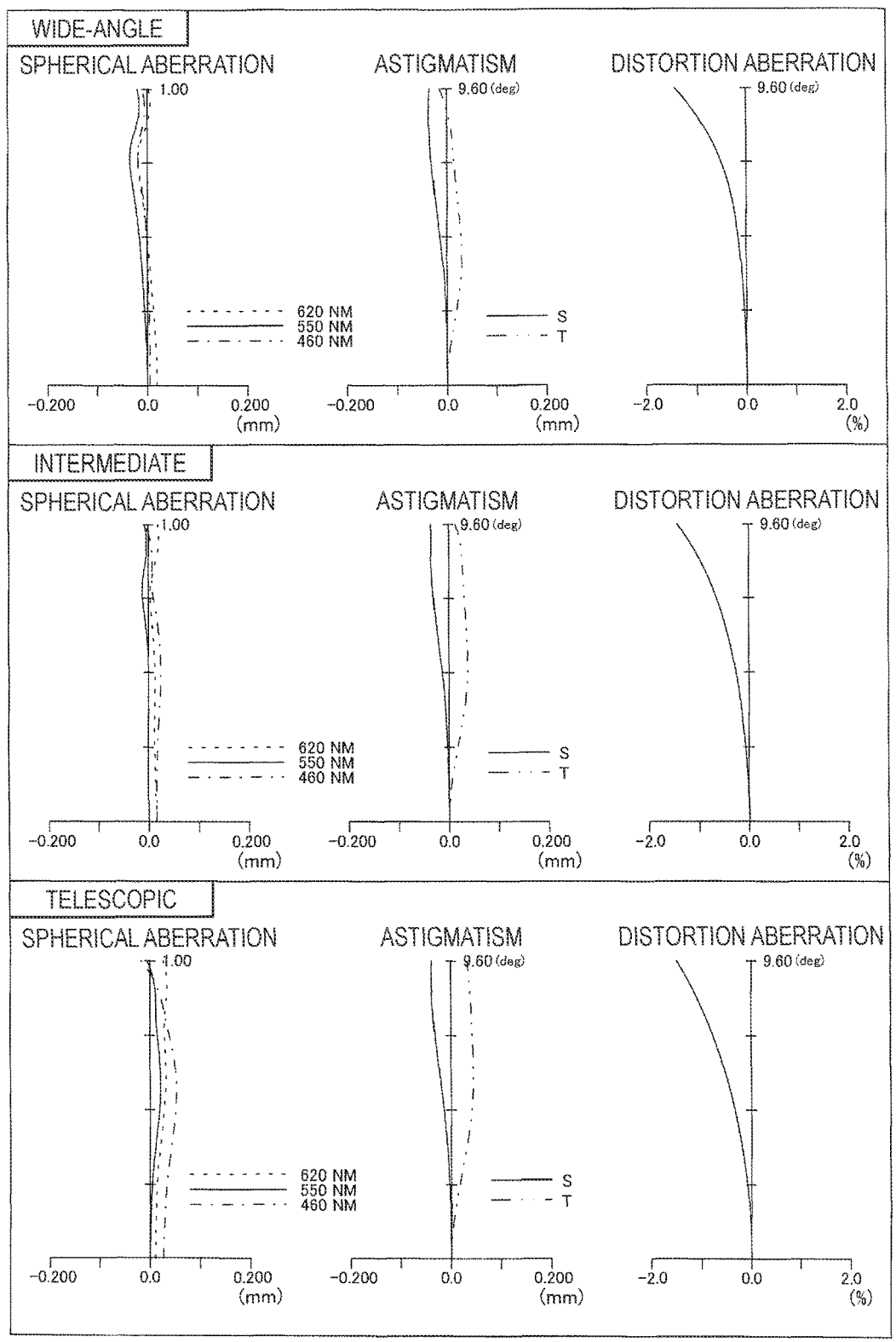
FIG. 13 is a reduction side aberration chart of the projection zoom lens according to Example 4.

FIG. 13 is a reduction side aberration chart of the projection zoom lens, and as shown in the drawing, the condition of the aberration in the wide-angle end is shown in the upper area, the condition of the aberration in the intermediate focal length position is shown in the middle area, and the condition of the aberration in the telescopic end is shown in the lower area. Further, in each of the areas, the spherical aberration, the astigmatism, and the distortion aberration are shown in this order from the left side.

Example 5

Table 13 below shows data of the lens surfaces of Example 5.

TABLE 13

| surface number | R | D | Nd | Vd |
|---|---|---|---|---|
| 0 | | 1800.000 | | |
| *1 | 23.262 | 2.200 | 1.53116 | 56.04 |
| *2 | 14.569 | 9.773 | | |
| 3 | 1024.368 | 1.800 | 1.72916 | 54.68 |
| 4 | 24.630 | 11.149 | | |
| 5 | 37.661 | 2.600 | 1.72825 | 28.46 |
| 6 | 80.550 | variable distance | | |
| 7 | 20.760 | 4.500 | 1.71700 | 47.93 |
| 8 | 650.554 | 10.000 | | |
| STO9 | Infinity | 0.995 | | |
| *10 | −25.366 | 1.200 | 1.83441 | 37.28 |
| *11 | 1824.594 | 2.556 | | |
| 12 | −16.904 | 1.100 | 1.73800 | 32.26 |
| 13 | 36.723 | 6.200 | 1.61800 | 63.33 |
| 14 | −18.257 | 0.200 | | |
| 15 | 88.397 | 7.300 | 1.49700 | 81.54 |
| 16 | −21.338 | variable distance | | |
| 17 | 34.964 | 4.800 | 1.48749 | 70.24 |
| 18 | −955.076 | variable distance | | |
| 19 | Infinity | 25.750 | 1.51680 | 64.20 |
| 20 | Infinity | 3.350 | | |
| 21 | Infinity | | | |

Figure 14:
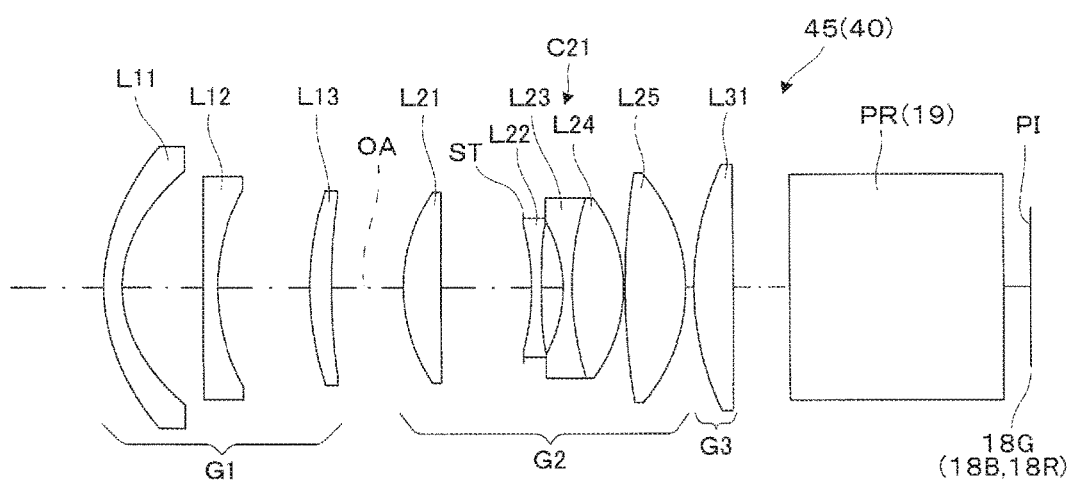
FIG. 14 is a diagram showing a configuration of a projection zoom lens according to Example 5.

Here, FIG. 14 is a cross-sectional view of the projection zoom lens 40 (projection zoom lens 45) according to Example 5.

Table 14 below shows the ranges of the focal length f, the half viewing angle ω, and the f-number FNo of the overall system of the projection zoom lens 40 (the projection zoom lens 45) according to Example 5 including the cases in which the projection zoom lens 40 is changed to the wide-angle end (Wide), an intermediate focal length position (Middle), and the telescopic end (Tele), respectively. Further, Table 14 shows the values of the axial surface distance D at the variable distance parts in the lens surfaces of Example 5 at the wide-angle end, the intermediate focal length position, and the telescopic end, respectively.

TABLE 14

| f: 16.9-20.28 FNo: 1.60-1.76 ω: 29.81°-25.66° | | | |
|---|---|---|---|
| surface number | Wide | Middle | Tele |
| 6 | 8.722 | 4.670 | 1.000 |
| 16 | 1.000 | 5.420 | 9.202 |
| 18 | 6.839 | 6.446 | 6.329 |

Table 15 below shows the aspherical coefficient of the lens surface of Example 5.

TABLE 15

| surface number | K | A04 | A06 | A08 | A10 | A12 |
|---|---|---|---|---|---|---|
| 1 | 0.0000 | −4.0696E−06 | −1.8924E−08 | 0.0000E+00 | 0.0000E+00 | 0.0000E+00 |
| 2 | −0.3468 | −5.8310E−06 | −8.4055E−08 | 1.1463E−10 | −7.2766E−13 | 0.0000E+00 |
| 10 | 0.3030 | 1.4018E−04 | −2.1465E−06 | 9.8215E−09 | 4.2235E−11 | −3.0497E−13 |
| 11 | 0.0000 | 1.9665E−04 | −1.9373E−06 | 1.0638E−08 | 0.0000E+00 | 0.0000E+00 |

Figure 15:
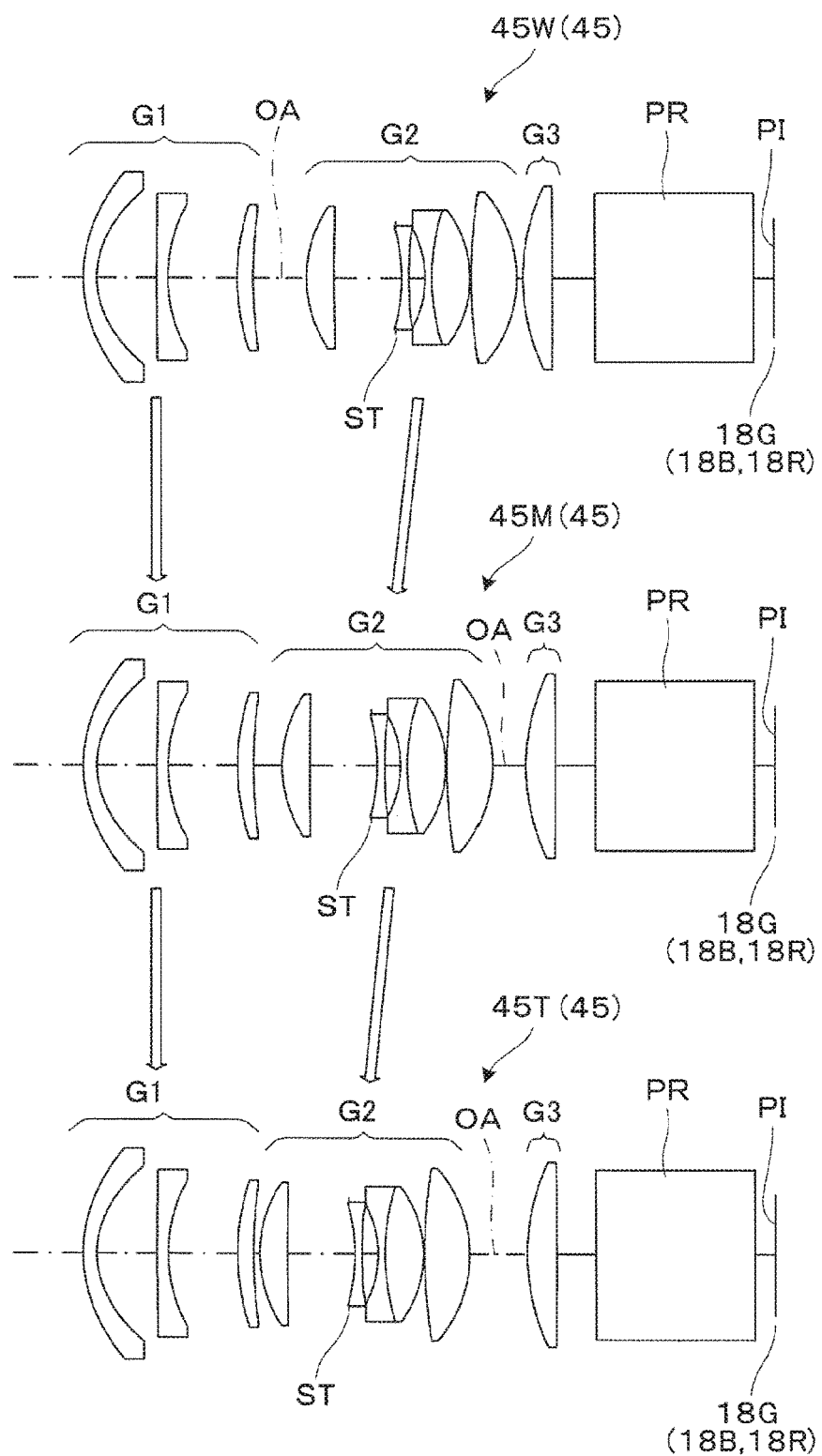
FIG. 15 is a diagram for explaining zoom by an optical system of Example 5.

The projection zoom lens 45 (corresponding to the projection zoom lens 40) according to Example 5 shown in FIG. 14 and FIG. 15 is for projecting the image on the panel surface PI in an enlarged manner with the magnifying power corresponding to the distance to the screen. In particular, similarly to the case shown in FIG. 3 and so on in Example 1, in FIG. 15, the upper area shows the projection zoom lens 45 (projection zoom lens 45W) in the wide-angle end, the middle area shows the projection zoom lens 45 (projection zoom lens 45M) in the intermediate focal length position, and the lower area shows the projection zoom lens 45 (projection zoom lens 45T) in the telescopic end, and FIG. 15 shows, as a whole, the condition of the transformation of the projection zoom lens 45 when changing the magnification from the wide-angle end to the telescopic end.

The projection zoom lens 45 is constituted by three lens groups, namely the first lens group G1 having negative refracting power, the second lens group G2 having positive refracting power, and the third lens group G3 having positive refracting power arranged in this order from the enlargement side. As shown in FIG. 15, the first lens group G1 is fixed (or practically semi-fixed) when zooming and when focusing. In contrast, when zooming from the wide-angle end to the telescopic end, the second lens group G2 moves toward the enlargement side, and the third lens group G3 moves toward the reduction side. In this case, the miniaturization becomes possible compared to a common four-or-more-group zoom lens described above.

Hereinafter, going back to FIG. 14, the details of each of the lenses constituting the projection zoom lens 45 will be described.

The first lens group G1 is constituted by the three lenses, namely the first lens (the lens L11) as a negative meniscus lens having the convex surface facing to the enlargement side, the second lens (the lens L12) as a negative meniscus lens having the convex surface facing to the enlargement side, and the third lens (the lens L13) as a positive meniscus lens having the convex surface facing to the enlargement side. Among these lenses, the first lens (the lens L11) is a resin molded lens provided with aspherical surfaces on the both surfaces.

The second lens group G2 is constituted by five lenses, namely a fourth lens (the lens L21) as a positive meniscus lens disposed on the most enlargement side and having the convex surface facing to the enlargement side, a fifth lens (the lens L22) as a biconcave negative lens, the cemented lens C21 of a sixth lens (the lens L23) as a biconcave negative lens and a seventh lens (the lens L24) as a biconvex positive lens, and an eighth lens (the lens L25) as a biconvex positive lens disposed on the most reduction side and having a convex surface higher in power facing to the reduction side than a convex surface facing to the enlargement side. Among these lenses, the fifth lens (the lens L22) is a glass molded lens provided with aspherical surfaces on the both surfaces. It should be noted that the aperture stop ST is disposed between the fourth lens (L21) and the fifth lens (L22).

The third lens group G3 is formed of a single lens, namely the ninth lens (the lens L31) as a positive lens having a convex surface facing to the enlargement side.

Therefore, the projection zoom lens 45 is constituted by the 9 lenses. The nine lenses L11 through L13, L21 through L25, and L31 each have a circular shape axisymmetric about the optical axis OA. Further, among these lenses, the both surfaces of the first lens L11 and the fifth lens L22 are each an aspherical surface. The other surfaces are all spherical surfaces.

Figure 16:
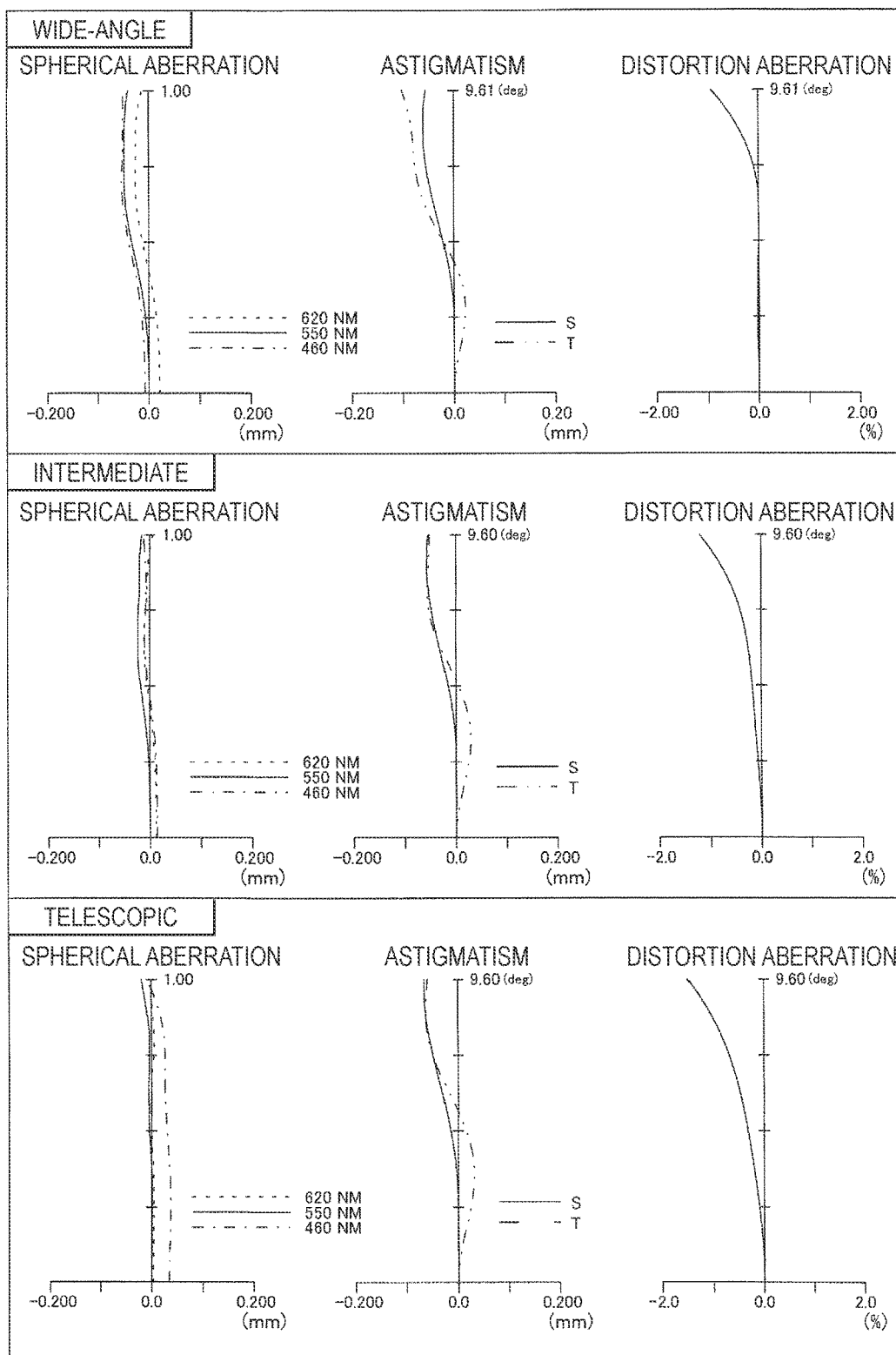
FIG. 16 is a reduction side aberration chart of the projection zoom lens according to Example 5.

FIG. 16 is a reduction side aberration chart of the projection zoom lens, and as shown in the drawing, the condition of the aberration in the wide-angle end is shown in the upper area, the condition of the aberration in the intermediate focal length position is shown in the middle area, and the condition of the aberration in the telescopic end is shown in the lower area. Further, in each of the areas, the spherical aberration, the astigmatism, and the distortion aberration are shown in this order from the left side.

Example 6

Table 16 below shows data of the lens surfaces of Example 6.

TABLE 16

| surface number | R | D | Nd | Vd |
|---|---|---|---|---|
| 0 | Infinity | 1800.000 | | |
| 1 | 174.573 | 1.400 | 1.74320 | 49.34 |
| 2 | 19.615 | 2.562 | | |
| *3 | 36.052 | 2.200 | 1.53116 | 56.04 |
| *4 | 16.312 | 8.698 | | |
| 5 | 43.170 | 3.600 | 1.76200 | 40.10 |
| 6 | −727.779 | variable distance | | |
| 7 | 29.299 | 4.200 | 1.74400 | 44.79 |
| 8 | −2418.371 | 12.677 | | |
| STO9 | Infinity | 6.500 | | |
| *10 | −20.402 | 1.600 | 1.82115 | 24.06 |
| *11 | 109.296 | 3.296 | | |
| 12 | −48.795 | 4.000 | 1.59522 | 67.73 |

TABLE 16-continued

| surface number | R | D | Nd | Vd |
|---|---|---|---|---|
| 13 | −21.983 | 0.100 | | |
| 14 | 413.917 | 8.000 | 1.49700 | 81.54 |
| 15 | −18.348 | variable distance | | |
| 16 | 43.904 | 4.400 | 1.48749 | 70.24 |
| 17 | −184.265 | variable distance | | |
| 18 | Infinity | 25.750 | 1.51680 | 64.20 |
| 19 | Infinity | 3.350 | | |
| 20 | Infinity | | | |

Figure 17:
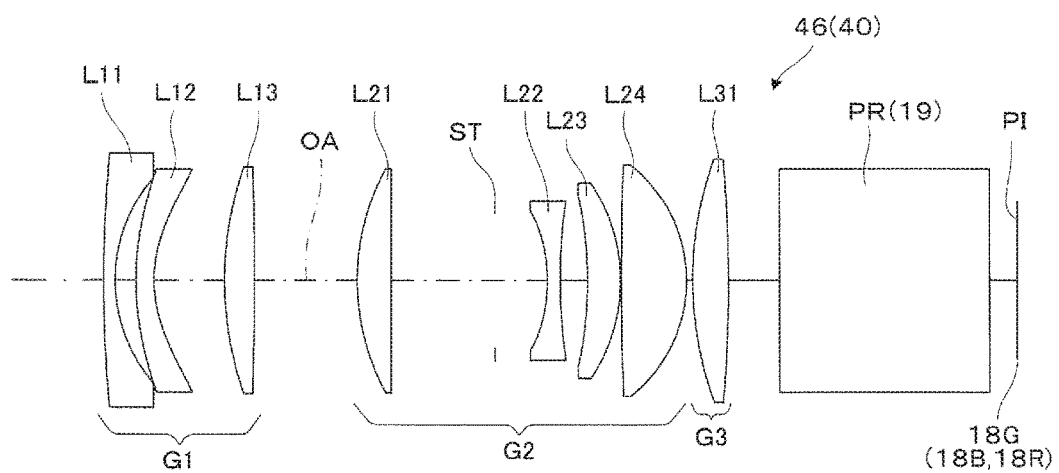
FIG. 17 is a diagram showing a configuration of a projection zoom lens according to Example 6.

Here, FIG. 17 is a cross-sectional view of the projection zoom lens 40 (projection zoom lens 46) according to Example 6.

Table 17 below shows the ranges of the focal length f, the half viewing angle ω, and the f-number FNo of the overall system of the projection zoom lens 40 (the projection zoom lens 46) according to Example 6 including the cases in which the projection zoom lens 40 is changed to the wide-angle end (Wide), an intermediate focal length position (Middle), and the telescopic end (Tele), respectively. Further, Table 17 shows the values of the axial surface distance D at the variable distance parts in the lens surfaces of Example 6 at the wide-angle end, the intermediate focal length position, and the telescopic end, respectively.

TABLE 17

| f: 16.9-20.28 | | | |
|---|---|---|---|
| FNo: 1.60-1.71 | | | |
| ω: 29.88°-25.71° | | | |
| surface number | Wide | Middle | Tele |
| 6 | 12.691 | 6.314 | 1.000 |
| 16 | 0.750 | 3.896 | 7.028 |
| 18 | 6.252 | 6.298 | 6.351 |

Table 18 below shows the aspherical coefficient of the lens surface of Example 6.

TABLE 18

| surface number | K | A04 | A06 | A08 | A10 | A12 |
|---|---|---|---|---|---|---|
| 3 | 0.0000 | −3.1515E−06 | −4.9414E−08 | 1.3814E−10 | 0.0000E+00 | 0.0000E+00 |
| 4 | −0.7501 | −2.8248E−05 | −1.1195E−07 | 4.1416E−10 | −7.7085E−13 | 0.0000E+00 |
| 10 | −2.0000 | −5.8045E−05 | −8.8805E−08 | −3.8033E−10 | −1.2210E−12 | 0.0000E+00 |
| 11 | −1.0000 | 2.6899E−05 | 9.1087E−09 | −1.1630E−10 | −4.4205E−13 | 0.0000E+00 |

Figure 18:
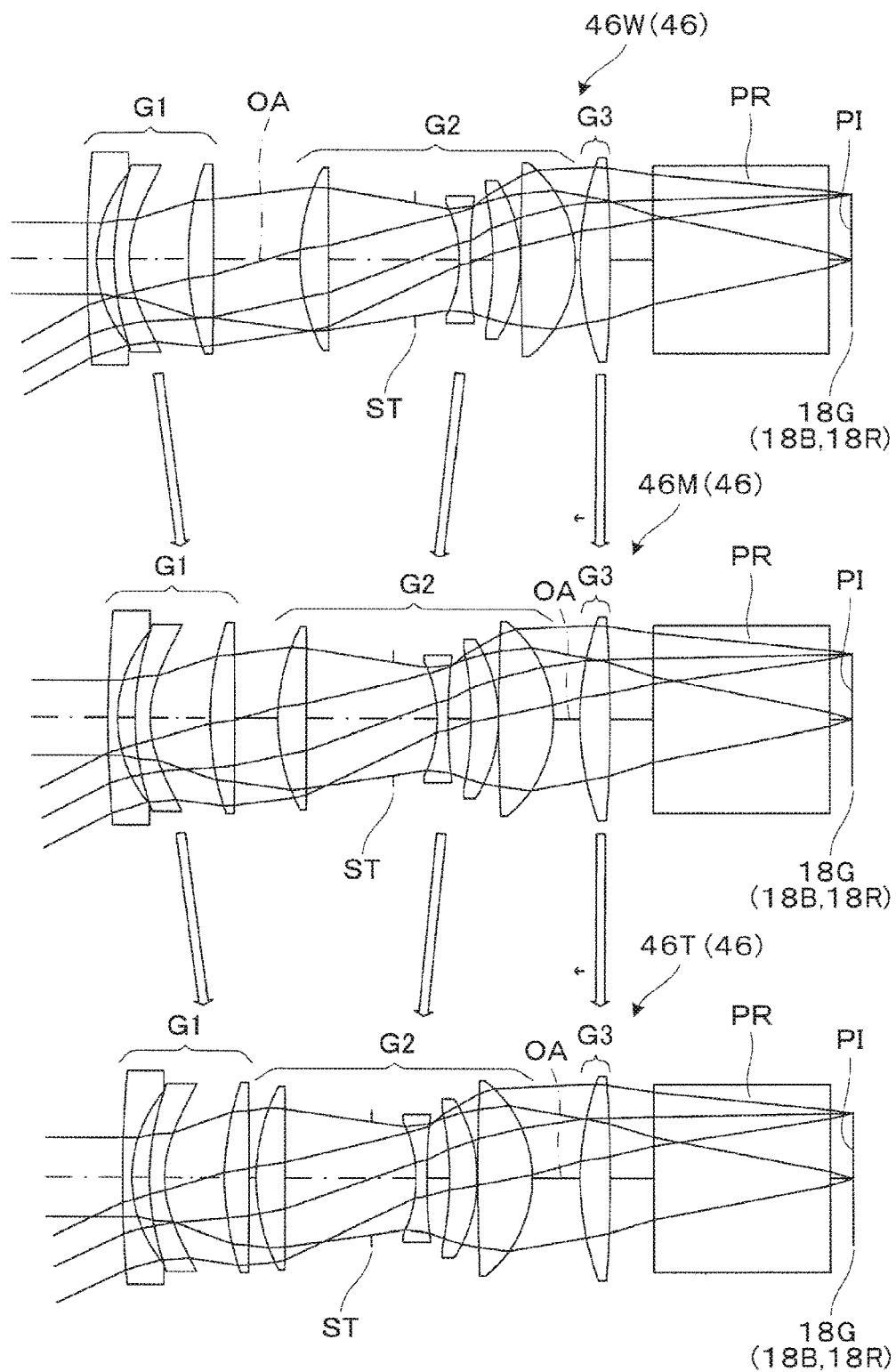
FIG. 18 is a diagram for explaining zoom by an optical system of Example 6.

The projection zoom lens 46 (corresponding to the projection zoom lens 40) according to Example 6 shown in FIG. 17 and FIG. 18 is for projecting the image on the panel surface PI in an enlarged manner with the magnifying power corresponding to the distance to the screen. In particular, similarly to the case shown in FIG. 3 and so on in Example 1, in FIG. 18, the upper area shows the projection zoom lens 46 (projection zoom lens 46W) in the wide-angle end, the middle area shows the projection zoom lens 46 (projection zoom lens 46M) in the intermediate focal length position, and the lower area shows the projection zoom lens 46 (projection zoom lens 46T) in the telescopic end, and FIG. 18 shows, as a whole, the condition of the transformation of the projection zoom lens 46 when changing the magnification from the wide-angle end to the telescopic end.

The projection zoom lens 46 is constituted by three lens groups, namely the first lens group G1 having negative refracting power, the second lens group G2 having positive refracting power, and the third lens group G3 having positive refracting power arranged in this order from the enlargement side. As shown in FIG. 18, all of the first through third lens group G1 through G3 move when zooming and when focusing. Specifically, when zooming from the wide-angle end to the telescopic end, the first lens group G1 moves toward the reduction side, the second lens group G2 moves toward the enlargement side, and the third lens group G3 slightly moves toward the enlargement side.

Hereinafter, going back to FIG. 17, the details of each of the lenses constituting the projection zoom lens 46 will be described.

The first lens group G1 is constituted by the three lenses, namely the first lens (the lens L11) as a negative meniscus lens having a convex surface facing to the enlargement side, the second lens (the lens L12) as a negative meniscus lens having a convex surface facing to the enlargement side, and the third lens (the lens L13) as a biconvex positive lens. Among these lenses, the second lens (the lens L12) is a resin molded lens provided with aspherical surfaces on the both surfaces.

The second lens group G2 is constituted by four lenses, namely the fourth lens (the lens L21) as a biconvex positive lens disposed on the most enlargement side and having a convex surface higher in power facing to the enlargement side than a convex surface facing to the reduction side, the fifth lens (the lens L22) as a biconcave negative lens, the sixth lens (the lens L23) as a positive meniscus lens having a concave surface facing to the enlargement side, and the seventh lens (the lens L24) as a biconvex positive lens disposed on the most reduction side and having a convex surface higher in power facing to the reduction side than a convex surface facing to the enlargement side. Among these lenses, the fifth lens (the lens L22) is a glass molded lens provided with aspherical surfaces on the both surfaces. It should be noted that the aperture stop ST is disposed between the fourth lens (L21) and the fifth lens (L22).

The third lens group G3 is formed of a single lens, namely the eighth lens (the lens L31) as a positive lens having a convex surface facing to the enlargement side.

Therefore, the projection zoom lens 46 is constituted by the 8 lenses. The eight lenses L11 through L13, L21 through L24, and L31 each have a circular shape axisymmetric about the optical axis OA. Further, among these lenses, the both surfaces of the second lens L12 and the fifth lens L22 are each an aspherical surface. The other surfaces are all spherical surfaces.

Figure 19:
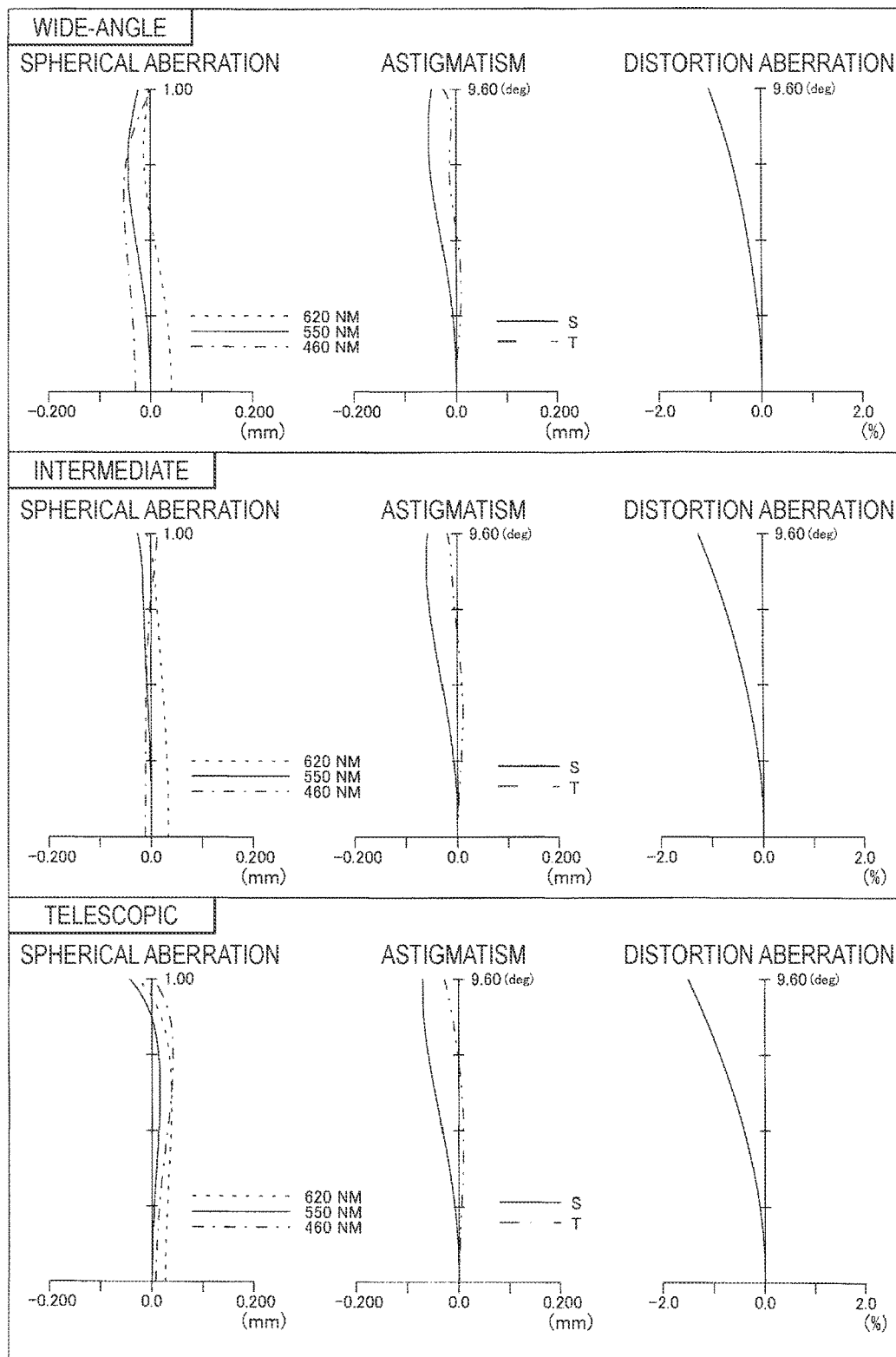
FIG. 19 is a reduction side aberration chart of the projection zoom lens according to Example 6.

FIG. 19 is a reduction side aberration chart of the projection zoom lens, and as shown in the drawing, the condition of the aberration in the wide-angle end is shown in the upper area, the condition of the aberration in the intermediate focal length position is shown in the middle area, and the condition of the aberration in the telescopic end is shown in the lower area. Further, in each of the areas, the spherical aberration, the astigmatism, and the distortion aberration are shown in this order from the left side.

Overview of Examples

Hereinafter, considerations related to the conditional formulas (1) through (4) on Examples 1 through 6 described above will be provided.

Table 19 below shows the numerical values in the examples related to the conditional formulas (1) through (5).

The table shows the fact that all of the numerical values satisfy the ranges (conditions) of the conditional formulas (1) through (5).

TABLE 19

|  | Example 1 | Example 2 | Example 3 | Example 4 | Example 5 | Example 6 |
|---|---|---|---|---|---|---|
| (1) $1.4 < Bf/fw < 2$ | 1.557 | 1.557 | 1.589 | 1.557 | 1.593 | 1.557 |
| (2) $1.5 < |f1/fw| < 3$ | 2.505 | 2.192 | 2.555 | 2.469 | 2.110 | 2.449 |
| (3) $1.5 < f2/fw < 3.5$ | 2.491 | 2.667 | 2.893 | 2.503 | 2.492 | 2.794 |
| (4) $0.5 < |R1/R2| < 2$ | 0.924 | 1.281 | 1.358 | 1.230 | 0.973 | 1.597 |
| (5) $2.5 < |fp/fw| < 6$ | 4.347 | 4.558 | 4.117 | 3.742 | 4.744 | 3.440 |

As described above, the projection zoom lens (a projection optical system) according to the present embodiment or the projection type image display device (projector) using the projection zoom lens has the projection system constituted by the lens groups having the three-group configuration, and can be configured as a zoom lens of the type in which, for example, the first and second lens groups, the second lens group alone, the second and third lens groups, or all of the first through three lens groups are moved when zooming, and the first lens group, for example, is moved when focusing. Further, by exceeding the lower limit of the conditional formula (1), the back focus is prevented from becoming too short to thereby ensure a sufficient space on the reduction side. Further, by setting a lower value than the upper limit of the conditional formula (1), the back focus is prevented from becoming too long while ensuring the space, and it is possible to prevent the lens diameter on the reduction side from becoming too large in the case of adopting a roughly telecentric configuration on the reduction side.

The invention is not limited to the embodiment or the examples described above, but can be implemented in a variety of forms within the scope or the spirit of the invention.

For example, in each of the examples, it is possible to add one or more lenses not substantially having power in the anterior or posterior stage, or between the lenses constituting each of the lens groups.

Further, the object of the enlarged projection by the projection zoom lens 40 as the projection optical system is not limited to the image formed by the liquid crystal panel, but it is possible to project the image formed by a light modulation element such as a digital micromirror device in an enlarged manner.

The entire disclosure of Japanese Patent Application No. 2016-205738, filed Oct. 20, 2016 is expressly incorporated by reference herein.

What is claimed is:

1. A zoom lens comprising:
   a first lens group having negative refracting power;
   a second lens group having positive refracting power; and
   a third lens group having positive refracting power,
   wherein three lens groups of the first lens group, the second lens group, and the third lens group are arranged in this order from a enlargement side,
   a distance between the first lens group and the second lens group, and a distance between the second lens group and the third lens group vary to achieve a magnification change and focusing when zooming, the second lens group includes
- a positive lens disposed on a most enlargement side and having a convex surface facing to the enlargement side, and one of a convex surface, which is lower in power than the convex surface facing to the enlargement side, and a concave surface on a reduction side, and
- a positive lens disposed on a most reduction side and having a convex surface facing to the reduction side, and one of a concave surface and a convex surface, which is lower in power than the convex surface facing to the reduction side, on the enlargement side, the third lens group is formed of a single positive lens having a convex surface facing to the enlargement side, and the following conditional formula (1) is fulfilled:

$$1.4 < Bf/fw < 2.0 \tag{1}$$

where fw: focal length of an overall lens system at a wide-angle end, and

Bf: focal length (air-equivalent length) of back focus.

2. The projection zoom lens according to claim 1, wherein the first lens group moves from the enlargement side toward the reduction side in the magnification change from the wide-angle end to a predetermined intermediate focal length position, and moves from the reduction side toward the enlargement side in zooming from the predetermined intermediate focal length position to the telescopic end.

3. The projection zoom lens according to claim 1, wherein the first lens group moves from the enlargement side toward the reduction side zooming from the wide-angle end to the telescopic end.

4. The projection zoom lens according to claim 1, wherein in zooming from the wide-angle end to the telescopic end, the first lens group is semi-fixed, the second lens group moves from the reduction side toward the enlargement side, and the third lens group moves from the enlargement side toward the reduction side.

5. The projection zoom lens according to claim 1, wherein in zooming from the wide-angle end to the telescopic end, the second lens group moves from the reduction side toward the enlargement side, and either of the first lens group and the third lens group is moved to thereby make it possible to correct a focus shift due to the magnification change.

6. The projection zoom lens according to claim 1, wherein the first lens group is constituted by three lenses consisting of two negative lenses and a positive lens arranged in this order from the enlargement side, and defining a focal length of the first lens group as f1, the following conditional formula (2) is fulfilled:

$$1.5 < |f1/fw| < 3.0. \tag{2}$$

7. The projection zoom lens according to claim 1, wherein the second lens group is constituted by five lenses, namely a positive lens having a convex surface facing to the enlargement side, a negative lens having a concave surface facing to the enlargement side, a negative lens having a concave surface facing to the enlargement side and a positive lens having a convex surface facing to the reduction side, and a positive lens having a convex surface facing to the enlargement side arranged in this order from the enlargement side, and defining a focal length of the second lens group as f2, the following conditional formula (3) is fulfilled:

$$1.5 < f2/fw < 3.5. \tag{3}$$

8. The projection zoom lens according to claim 7, wherein in the second lens group, the negative lens having the concave surface facing to the enlargement side and the positive lens having the convex surface facing to the reduction side are a cemented lens.

9. The projection zoom lens according to claim 1, wherein the second lens group is constituted by four lenses, namely a positive lens having a convex surface facing to the enlargement side, a negative lens having a concave surface facing to the enlargement side, a positive lens having a convex surface facing to the reduction side, and a positive lens having a convex surface facing to the enlargement side arranged in this order from the enlargement side, and defining a focal length of the second lens group as f2, the following conditional formula (3) is fulfilled:

$$1.5 < f2/fw < 3.5. \tag{3}$$

10. The projection zoom lens according to claim 1, wherein defining a curvature radius of a surface on the most enlargement side of the second lens group as R1, and a curvature radius of a surface on the most reduction side as R2, the following conditional formula (4) is fulfilled:

$$0.5 < |R1/R2| < 2.0. \tag{4}$$

11. The projection zoom lens according to claim 1, wherein the first lens group includes at least one aspherical lens formed of resin, and having negative power, and defining a focal length of the aspherical lens as fp, the following conditional formula (5) is fulfilled:

$$2.5 < |fp/fw| < 6.0. \tag{5}$$

12. A projection type image display device comprising: the projection zoom lens according to claim 1.
13. A projection type image display device comprising: the projection zoom lens according to claim 2.
14. A projection type image display device comprising: the projection zoom lens according to claim 3.
15. A projection type image display device comprising: the projection zoom lens according to claim 4.
16. A projection type image display device comprising: the projection zoom lens according to claim 5.
17. A projection type image display device comprising: the projection zoom lens according to claim 6.
18. A projection type image display device comprising: the projection zoom lens according to claim 7.
19. A projection type image display device comprising: the projection zoom lens according to claim 8.
20. A projection type image display device comprising: the projection zoom lens according to claim 9.

* * * * *